United States Patent
Rana

(10) Patent No.: US 11,522,446 B2
(45) Date of Patent: Dec. 6, 2022

(54) LOW INPUT SUPPLY AND LOW OUTPUT IMPEDANCE CHARGE PUMP CIRCUIT CONFIGURED FOR POSITIVE AND NEGATIVE VOLTAGE GENERATION

(71) Applicant: STMicroelectronics International N.V., Geneva (CH)

(72) Inventor: Vikas Rana, Noida (IN)

(73) Assignee: STMicroelectronics International N.V., Geneva (CH)

(*) Notice: Subject to any disclaimer, the term of this patent is extended or adjusted under 35 U.S.C. 154(b) by 0 days.

(21) Appl. No.: 17/494,244

(22) Filed: Oct. 5, 2021

(65) Prior Publication Data
US 2022/0158552 A1    May 19, 2022

Related U.S. Application Data

(60) Provisional application No. 63/115,835, filed on Nov. 19, 2020.

(51) Int. Cl.
*H02M 3/07* (2006.01)
*G05F 1/59* (2006.01)
*H02M 1/00* (2006.01)

(52) U.S. Cl.
CPC ............. *H02M 3/071* (2021.05); *G05F 1/59* (2013.01); *H02M 1/0006* (2021.05); *H02M 3/075* (2021.05); *H02M 3/078* (2021.05)

(58) Field of Classification Search
CPC ............................ H02M 3/071; H02M 3/076
See application file for complete search history.

(56) References Cited

U.S. PATENT DOCUMENTS

| | | |
|---|---|---|
| 6,359,947 B1 | 3/2002 | Rao |
| 6,366,158 B1 | 4/2002 | Zeng et al. |
| 6,452,438 B1 | 9/2002 | Li |
| 6,496,055 B2 | 12/2002 | Li |
| 6,646,493 B2 | 11/2003 | Butler |
| 6,686,793 B2 | 2/2004 | Li |
| 7,342,438 B2 | 3/2008 | Muneer et al. |
| 9,673,713 B2 | 6/2017 | Kovacic et al. |
| 10,050,524 B1 | 8/2018 | Rana |
| 10,461,636 B2 * | 10/2019 | Rana ................ H02M 3/07 |
| 10,476,383 B2 * | 11/2019 | Di Gilio ............ H02M 3/07 |
| 11,031,865 B2 * | 6/2021 | Rana ................ H02M 3/073 |
| 2019/0123638 A1 | 4/2019 | Rana |

* cited by examiner

*Primary Examiner* — Jeffery S Zweizig
(74) *Attorney, Agent, or Firm* — Crowe & Dunlevy

(57) ABSTRACT

The charge transfer transistors of a positive or negative charge pump are biased at their gate terminals with a control voltage that provides for an higher level of gate-to-source voltage in order to reduce switch resistance in passing a boosted (positive or negative) voltage to a voltage output of the charge pump. This control voltage is generated using a bootstrapping circuit whose polarity of operation (i.e., negative or positive) is opposite to a polarity (i.e., positive or negative) of the charge pump.

36 Claims, 17 Drawing Sheets

LOW INPUT SUPPLY AND LOW OUTPUT IMPEDANCE CHARGE PUMP CIRCUIT CONFIGURED FOR POSITIVE AND NEGATIVE VOLTAGE GENERATION

CROSS-REFERENCE TO RELATED APPLICATIONS

This application claims priority from United States Provisional Application for Patent No. 63/115,835, filed Nov. 19, 2020, the disclosure of which is incorporated herein by reference.

TECHNICAL FIELD

The present invention relates to charge pump circuits configured to generate positive and negative voltages.

BACKGROUND

Reference is made to FIG. 1A showing a circuit diagram for a positive charge pump circuit 100p. The circuit 100p includes an n-channel MOS transistor MN1 having a source terminal coupled to supply node 102 and a drain terminal coupled to intermediate node NA1 and an n-channel MOS transistor MN2 having a source terminal coupled to supply node 102 and a drain terminal coupled to intermediate node NA2. The circuit 100p further includes a p-channel MOS transistor MP1 having a source terminal coupled to output node 104 and a drain terminal coupled to node NA1 and a p-channel MOS transistor MP2 having a source terminal coupled to output node 104 and a drain terminal coupled to intermediate node NA2. The gate terminals of transistors MN1 and MP1 are connected together and are further connected to intermediate node NA2. The gate terminals of transistors MN2 and MP2 are connected together and are further connected to intermediate node NA1. The transistors MN1, MN2, MP1 and MP2 form a CMOS latch circuit.

A capacitor C1 has one terminal coupled to node NA1 and another terminal coupled to receive the logical inversion of a clock signal CK, that logical inversion being generated by a CMOS inverter circuit 106 powered from a positive supply voltage Vdd and receiving clock signal CK as an input. A capacitor C2 has one terminal coupled to node NA2 and another terminal coupled to receive a logical inversion of a clock signal CKN (which is a logical inversion of the clock signal CK), that logical inversion being generated by a CMOS inverter circuit 108 powered from the positive supply voltage Vdd and receiving clock signal CKN as an input.

A load 107 of the circuit 100p is schematically represented by a load capacitor Cload having one terminal coupled to output node 104 and a second terminal coupled to a ground node and a current source Iload coupled between output node 104 and the ground node.

The supply node 102 is configured to receive the positive supply voltage Vdd. The output node 104 is configured to generate a multiplied positive output voltage Vpos, where Vpos is approximately 2*Vdd.

Reference is made to FIG. 1B showing a circuit diagram for a negative charge pump circuit 100n. The circuit 100n includes a p-channel MOS transistor MP1 having a source terminal coupled to supply node 102 and a drain terminal coupled to intermediate node NA1 and a p-channel MOS transistor MP2 having a source terminal coupled to supply node 102 and a drain terminal coupled to intermediate node NA2. The circuit 100n further includes an n-channel MOS transistor MN1 having a source terminal coupled to output node 104 and a drain terminal coupled to intermediate node NA1 and an n-channel MOS transistor MN2 having a source terminal coupled to output node 104 and a drain terminal coupled to intermediate node NA2. The gate terminals of transistors MN1 and MP1 are connected together and are further connected to intermediate node NA2. The gate terminals of transistors MN2 and MP2 are connected together and are further connected to intermediate node NA1. The transistors MN1, MN2, MP1 and MP2 form a CMOS latch circuit.

A capacitor C1 has one terminal coupled to node NA1 and another terminal coupled to receive the logical inversion of a clock signal CK, that logical inversion being generated by a CMOS inverter circuit 106 powered from a positive supply voltage Vdd and receiving clock signal CK as an input. A capacitor C2 has one terminal coupled to node NA2 and another terminal coupled to receive a logical inversion of a clock signal CKN (which is a logical inversion of the clock signal CK), that logical inversion being generated by a CMOS inverter circuit 108 powered from the positive supply voltage Vdd and receiving clock signal CKN as an input.

A load 107 of the circuit 100n is schematically represented by a load capacitor Cload having one terminal coupled to output node 104 and a second terminal coupled to a ground node and a current source Iload coupled between the positive supply voltage Vdd and output node 104.

The supply node 102 is configured to receive the ground voltage Vgnd. The output node 104 is configured to generate a multiplied negative output voltage Vneg, where Vneg is approximately equal to −Vdd.

The output impedance at output node 104 depends on the frequency of the clock signals CK and CKN and the on-resistance (Rds_on) of the switching transistors MN1, MN2, MP1 and MP2 performing the charge transfer. The output impedance is given by the following formula:

$$R_{out} = \frac{1}{(f_{CLK} * C)} + R_{ds\_on}$$

where: C is the capacitance of the flying capacitor (i.e., C1 or C2 depending on phase of the clock).

The on-resistance (Rds_on) of the transistors MN1, MN2, MP1 and MP2 is given by the following formula:

$$R_{ds\_on} = \frac{L}{(\mu C_{OX} W (V_{GS} - V_{TH}))}$$

where: L is the length of the transistor, W is the width of the transistor, Cox is gate capacitance, $V_{GS}$ is the gate to source voltage, and $V_{TH}$ is the threshold voltage.

If the transistor width W is decreased, the on-resistance (Rds_on) increases and there will be a larger voltage drop across each switching transistor, with a corresponding decrease in efficiency.

The switch capacitance is given by the formula:

$$C_{SW} = C_{OX} * W * L_{eff}$$

where: $L_{eff}$ is the effective length of the transistor switches.

It will be noted that if the transistor width W is increased, this will result in an increase of the capacitance on the upper plate of the capacitor, with a corresponding increase in charge loss and reduction of efficiency.

Reference is now made to FIG. 2A which shows a circuit diagram for a positive charge pump circuit 200p (see, also, FIG. 2A of U.S. patent application Ser. No. 16/911,967 filed Jun. 25, 2020—incorporated herein by reference). The circuit 200p includes a (positive) bootstrapping circuit including an n-channel MOS transistor MN1 having a source terminal coupled to supply node 202 and a drain terminal coupled to intermediate node NA1 and an n-channel MOS transistor MN2 having a source terminal coupled to supply node 202 and a drain terminal coupled to intermediate node NA2. The transistors MN1 and MN2 are cross-coupled with the gate terminal of transistor MN1 coupled to the drain terminal of transistor MN2 at node NA2 and the gate terminal of transistor MN2 coupled to the drain terminal of transistor MN1 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 206p powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 208p powered from the positive supply voltage Vdd and receiving clock signal CKN as an input.

A CMOS switching circuit 210p has a first terminal coupled to receive the positive supply voltage Vdd and a second terminal at intermediate node NB1. A source terminal of the p-channel MOS transistor MP1 in switching circuit 210p is coupled to the node NA1 and a source terminal of the n-channel MOS transistor MN3 in switching circuit 210p is coupled to receive the clock signal CKN. The second terminal is at the common drains of transistors MP1 and MN3. The gates of transistors MP1 and MN3 are coupled to the first terminal (Vdd).

A CMOS switching circuit 212p has a first terminal coupled to receive the positive supply voltage Vdd and a second terminal at intermediate node NB2. A source terminal of the p-channel MOS transistor MP2 in switching circuit 212p is coupled to the node NA2 and a source terminal of the n-channel MOS transistor MN4 in switching circuit 212p is coupled to receive the clock signal CK. The second terminal is at the common drains of transistors MP2 and MN4. The gates of transistors MP2 and MN4 are coupled to the first terminal (Vdd).

The circuits 210p and 212p with the bootstrapping circuit form a bootstrap-based level shifting circuit.

A CMOS switching circuit 220p has a first terminal coupled to node NB1 and a second terminal at intermediate node NC1. A source terminal of the n-channel MOS transistor MN5 in switching circuit 220p is coupled to supply node 202 and a source terminal of the p-channel MOS transistor MP3 in switching circuit 220p is coupled to output node 204. The second terminal is at the common drains of transistors MN5 and MP3. The gate terminals of the transistors MN5 and MP3 are coupled to the first terminal (NB1).

A CMOS switching circuit 222p has a first terminal coupled to node NB2 and a second terminal at intermediate node NC2. A source terminal of the n-channel MOS transistor MN6 in switching circuit 222p is coupled to supply node 202 and a source terminal of the p-channel MOS transistor MP4 in switching circuit 222p is coupled to output node 204. The second terminal is at the common drains of transistors MN6 and MP4. The gate terminals of the transistors MN6 and MP4 are coupled to the first terminal (NB2).

A capacitor C1 has one terminal coupled to node NC1 and another terminal coupled to receive the logical inversion of the clock signal CK1N, that logical inversion being generated by a CMOS inverter circuit 216p powered from the positive supply voltage Vdd and receiving clock signal CK1N as an input. A capacitor C2 has one terminal coupled to node NC2 and another terminal coupled to receive a logical inversion of the clock signal CK1, that logical inversion being generated by a CMOS inverter circuit 218p powered from the positive supply voltage Vdd and receiving clock signal CK1 as an input.

A load 207 of the circuit 200p is schematically represented by a load capacitor Cload having one terminal coupled to output node 204 and a second terminal coupled to a ground node and a current source Iload coupled between output node 204 and the ground node.

The supply node 202 is configured to receive the positive supply voltage Vdd. The output node 204 is configured to generate a multiplied positive output voltage Vpos, where Vpos is approximately 2*Vdd.

FIG. 2B shows the waveforms for the clock signals CK, CKN, CK1 and CK1N as well as the signals at nodes NA1, NA2, NB1, NB2, NC1 and NC2 for the operation of the circuit 200p of FIG. 2A. It will be noted that, for ease of understanding the operation of the circuit 200p, signal propagation delays are not shown in the FIG. 2B waveforms. It will be further noted that the voltage levels of the clock signals are idealized, and that as implemented the voltages will be substantially equal to (for example, within 1-20%), but not necessarily equal to, the ideal Vdd and 2*Vdd voltage levels.

The circuitry formed by transistors MN1, MN2, bootstrap capacitors Cbs1, Cbs2 and inverters 206p, 208p is a positive bootstrapping circuit that functions in response to the clock signals CK, CKN referenced to the power supply Vdd and ground to generate clock signals at nodes NA1, NA2 referenced to 2*Vdd and Vdd. When clock signal CK is logic high (Vdd), the clock signal CK1N output by inverter 206p will be logic low (Gnd). Transistor MN1 turns on because node NA2 is boosted through capacitor Cbs2 to the 2*Vdd voltage level (i.e., turned on because the gate voltage of transistor MN1 exceeds Vdd at the source terminal by more than Vth) and the bootstrap capacitor Cbs1 is charged to the Vdd voltage level. In the next phase of the clock signals, the clock signal CK is logic low and clock signal CK1N output by inverter 206p will be logic high. Transistor MN1 turns off because node NA2 is at the Vdd voltage level (i.e., turns off because the gate voltage of transistor MN1 is equal to the source voltage Vdd and thus does not exceed Vth) and the voltage at node NA1 is boosted through the bootstrap voltage Vdd stored on capacitor Cbs1 to the 2*Vdd voltage level. A similar process occurs in response to the phases of the clock signals CKN and CK1.

The circuitry formed by the CMOS switching circuits 210p and 212p functions as a level shifting stage to shift the clock signals at nodes NA1, NA2 referenced to 2*Vdd and Vdd to generate clock signals at nodes NB1, NB2 referenced to 2*Vdd and ground. Consider the following with respect to the circuit 210p operation: when clock signal CKN is logic low, transistor MN3 is turned on (i.e., because the gate voltage of transistor MN3 exceeds ground at the source terminal by more than Vth) and node NB1 is clamped to ground. Transistor MP1 is off because node NA1 is at the Vdd level. In the next phase of the clock signals, clock signal CKN is logic high which causes transistor MN3 to turn off (i.e., because the gate voltage of transistor MN3 is equal to the source voltage Vdd and thus does not exceed Vth). In that same phase, node NA1 is at the 2*Vdd voltage level (see, discussion above), and transistor MP1 turns on (i.e., the Vgs of transistor MP1 exceeds the Vth) passing the 2*Vdd voltage level to node NB1. A similar process occurs with respect to the circuit 212p in response to the phases of the clock signal CK.

The circuitry formed by capacitor C1, C2 and inverters 216p, 218p functions in response to the clock signals CK1, CK1N referenced to the power supply Vdd and ground to generate clock signals at nodes NC1, NC2 referenced to 2*Vdd and Vdd. Consider the following operation with respect to the circuit with capacitor C1 and inverter 216p: when clock signal CK1N is logic high, the output of the inverter 216p is logic low. At the same time, as will be discussed below, transistor MN5 is turned on and the capacitor C1 is charged to the Vdd voltage level. In the next phase of the clock signals, clock signal CK1N is logic low, and the output of the inverter 216p is logic high. The voltage at node NC1 is boosted through capacitor C1 to the 2*Vdd voltage level. A similar process occurs with respect to the circuit with capacitor C2 and inverter 218p in response to the phases of the clock signal CK1.

The circuitry formed by the CMOS switching circuits 220p and 222p functions as a charge transfer drive stage to selectively pass the 2*Vdd voltage at nodes NC1, NC2 to the output node 204 in order to drive the capacitive and current load 207. Consider the following with respect to the circuit 220p operation: when clock signals CKN and CK1N are both logic high, the voltage at node NB1 is at the 2*Vdd voltage level and the transistor MN5 is turned on (i.e., the Vgs of transistor MN5 exceeds the Vth) to charge the capacitor C1 to the Vdd voltage level. In the next phase of the clock signals, when clock signals CKN and CK1N are both logic low, the voltage at node NB1 is at the ground level and the transistor MP3 is turned on (i.e., the Vgs of transistor MP3 exceeds the Vth) to pass the 2*Vdd voltage level at node NC1 to the output node 204. A similar process occurs with respect to the circuit 222p in response to the phases of the clock signals CK and CK1.

An advantage of the circuit implementation is an increase in the Vgs of the charge transfer switching transistors in order to reduce the on-resistance (Rds_on). There is a corresponding reduction in the output impedance in comparison to the charge pump circuit of FIG. 1A, for example.

Reference is now made to FIG. 3A which shows a circuit diagram for a negative charge pump circuit 200n (see, also, FIG. 2E of U.S. patent application Ser. No. 16/911,967 filed Jun. 25, 2020—incorporated herein by reference). The circuit 200n includes a negative bootstrapping circuit including a p-channel MOS transistor MP1 having a source terminal coupled to supply node 202 and a drain terminal coupled to intermediate node NA1 and a p-channel MOS transistor MP2 having a source terminal coupled to supply node 202 and a drain terminal coupled to intermediate node NA2. The transistors MP1 and MP2 are cross-coupled with the gate terminal of transistor MP1 coupled to the drain terminal of transistor MP2 at node NA2 and the gate terminal of transistor MP2 coupled to the drain terminal of transistor MP1 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 206n powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 208n powered from the positive supply voltage Vdd and receiving clock signal CKN as an input.

A CMOS switching circuit 210n has a first terminal coupled to receive the ground voltage Gnd and a second terminal at intermediate node NB1. A source terminal of the p-channel MOS transistor MP3 in switching circuit 210n is coupled to receive the clock signal CKN and a source terminal of the n-channel MOS transistor MN1 in switching circuit 210n is coupled to the node NA1. The second terminal is at the common drains of transistors MP3 and MN1. The gates of transistors MP3 and MN1 are coupled to the first terminal (Gnd).

A CMOS switching circuit 212n has a first terminal coupled to receive the ground voltage Gnd and a second terminal at intermediate node NB2. A source terminal of the p-channel MOS transistor MP4 in switching circuit 212n is coupled to receive the clock signal CK and a source terminal of the n-channel MOS transistor MN2 in switching circuit 212n is coupled to the NA2. The second terminal is at the common drains of transistors MP4 and MN2. The gate terminals of transistors MP4 and MN2 are coupled to the first terminal (Gnd).

The circuits 210n and 212n with the bootstrapping circuit form a bootstrap-based level shifting circuit.

A CMOS switching circuit 220n has a first terminal coupled to node NB1 and a second terminal at intermediate node NC1. A source terminal of the p-channel MOS transistor MP5 in switching circuit 220n is coupled to supply node 202 and a source terminal of the n-channel MOS transistor MN3 in switching circuit 220n is coupled to output node 204. The second terminal is at the common drains of transistors MP5 and MN3. The gates of transistors MP5 and MN3 are coupled to the first terminal (NB1).

A CMOS switching circuit 222n has a first terminal coupled to node NB2 and a second terminal at intermediate node NC2. A source terminal of the p-channel MOS transistor MP6 in switching circuit 222n is coupled to node 202 and a source terminal of the n-channel MOS transistor MN4 in switching circuit 222n is coupled to output node 204. The second terminal is at the common drains of transistors MP6 and MN4. The gates of transistors MP6 and MN4 are coupled to the first terminal (NB2).

A capacitor C1 has one terminal coupled to node NC1 and another terminal coupled to receive the logical inversion of the clock signal CK1N, that logical inversion being generated by a CMOS inverter circuit 216n powered from the positive supply voltage Vdd and receiving the clock signal CK1N as an input. A capacitor C2 has one terminal coupled to node NC2 and another terminal coupled to receive a logical inversion of the clock signal CK1, that logical inversion being generated by a CMOS inverter circuit 218n powered from the positive supply voltage Vdd and receiving clock signal CK1 as an input.

A load 207 of the circuit 200n is schematically represented by a load capacitor Cload having one terminal coupled to output node 204 and a second terminal coupled to a ground node and a current source Iload coupled between the positive supply voltage Vdd and output node 204.

The supply node 202 is configured to receive the ground voltage Vgnd. The output node 204 is configured to generate a multiplied negative output voltage Vneg, where Vneg is approximately −Vdd.

FIG. 3B shows the waveforms for the clock signals CK, CKN, CK1 and CK1N as well as the signals at nodes NA1, NA2, NB1, NB2, NC1 and NC2 for the operation of the circuit 200n of FIG. 3A. It will be noted that, for ease of understanding the operation of the circuit 200n, signal propagation delays are not shown in the FIG. 3B waveforms. It will be further noted that the voltage levels of the clock signals are idealized, and that as implemented the voltages will be substantially equal to (for example, within 1-20%), but not necessarily equal to, the Vdd and −Vdd voltage levels.

The circuitry formed by transistors MP1, MP2, bootstrap capacitors Cbs1, Cbs2 and inverters 206n, 208n is a negative bootstrapping circuit that functions in response to the clock signals CK, CKN referenced to the power supply Vdd and ground to generate clock signals at nodes NA1, NA2 referenced to −Vdd and ground. When clock signal CKN is logic low (Gnd), the clock signal CK1 output by inverter 208n will be logic high (Vdd). Transistor MP2 turns on because node NA1 is boosted through capacitor Cbs1 to the −Vdd voltage level (i.e., turned on because the gate voltage of transistor MP2 is less than ground at the source terminal by more than Vth) and the bootstrap capacitor Cbs2 is charged at node NA2 to the ground voltage level. In the next phase of the clock signals, the clock signal CKN is logic high and clock signal CK1 output by inverter 208n will be logic low. Transistor MP2 turns off because node NA1 is at the ground voltage level (i.e., turns off because the gate voltage of transistor MP2 is equal to the source voltage ground and thus does not exceed Vth) and the voltage at node NA2 is boosted through the bootstrap ground voltage stored on capacitor Cbs2 to the −Vdd voltage level. A similar process occurs in response to the phases of the clock signals CK and CK1N.

The circuitry formed by the CMOS switching circuits 210n and 212n functions as a level shifting stage to shift the clock signals at nodes NA1, NA2 referenced to −Vdd and ground to generate clock signals at nodes NB1, NB2 referenced to −Vdd and +Vdd. Consider the following with respect to the circuit 212n operation: when clock signal CK is logic high, transistor MP4 is turned on (i.e., because the gate voltage of transistor MP4 is less than the source terminal by more than Vth), transistor MN2 is turned off (i.e., because node NA2 is at ground), and node NB2 is clamped to Vdd. In the next phase of the clock signals, clock signal CK is logic low which causes transistor MP4 to turn off (i.e., because the gate voltage of transistor MP4 is equal to the source voltage ground and thus does not exceed Vth). In that same phase, node NA2 is at the −Vdd voltage level (see, discussion above), and transistor MN2 turns on (i.e., the Vgs of transistor MN2 exceeds the Vth) passing the −Vdd voltage level to node NB2. A similar process occurs with respect to the circuit 210n in response to the phases of the clock signal CKN.

The circuitry formed by capacitor C1, C2 and inverters 216n, 218n functions in response to the clock signals CK1, CK1N referenced to the power supply Vdd and ground to generate clock signals at nodes NC1, NC2 referenced to −Vdd and ground. Consider the following operation with respect to the circuit with capacitor C2 and inverter 218n: when clock signal CK1 is logic low, the output of the inverter 218n is logic high. At the same time, as will be discussed below, transistor MP6 is turned on and the capacitor C2 is discharged to the ground voltage level. In the next phase of the clock signals, clock signal CK1 is logic high, and the output of the inverter 218n is logic low. The voltage at node NC2 is boosted through capacitor C2 to the −Vdd voltage level. A similar process occurs with respect to the circuit with capacitor C1 and inverter 216n in response to the phases of the clock signal CK1N.

The circuitry formed by the CMOS switching circuits 220n and 222n functions as a charge transfer drive stage to selectively pass the −Vdd voltage at nodes NC1, NC2 to the output node 204 in order to drive the capacitive and current load 207. Consider the following with respect to the circuit 222n operation: when clock signals CK and CK1 are both logic low, the voltage at node NB2 is at the −Vdd voltage level and the transistor MP6 is turned on (i.e., the Vgs of transistor MP6 exceeds the Vth) to discharge the capacitor C2 to the ground voltage level. In the next phase of the clock signals, when clock signals CK and CK1 are both logic high, the voltage at node NB2 is at the Vdd level and the transistor MN4 is turned on (i.e., the Vgs of transistor MN4 exceeds the Vth) to pass the −Vdd voltage level at node NC2 to the node 204. A similar process occurs with respect to the circuit 220n in response to the phases of the clock signals CKN and CK1N.

An advantage of the circuit implementation is an increase in the Vgs of the charge transfer switching transistors in order to reduce the on-resistance (Rds_on). There is a corresponding reduction in the output impedance in comparison to the charge pump circuit of FIG. 1B, for example.

SUMMARY

In an embodiment, a positive charge pump circuit is configured to generate an output voltage from an input voltage, wherein a positive voltage level of the output voltage is more positive than a voltage level of the input voltage. The positive charge pump circuit comprises: a negative bootstrapping circuit configured to generate a control signal in response to a first clock signal, wherein the control signal switches between a ground voltage and a negative voltage; a voltage boosting circuit configured to generate a positively boosted voltage in response to a second clock signal; and a charge transfer transistor having a drain terminal coupled to receive said positively boosted voltage and a source terminal coupled to an output node, wherein a gate terminal of the charge transfer transistor is biased by the negative voltage of the control signal to turn on and pass the positively boosted voltage to the output node and generate said output voltage.

In an embodiment, a negative charge pump circuit is configured to generate an output voltage from an input voltage, wherein a negative voltage level of the output voltage is more negative than a voltage level of the input voltage. The negative charge pump circuit comprises: a positive bootstrapping circuit configured to generate a control signal in response to a first clock signal, wherein the control signal switches between a first positive voltage and a second positive voltage, wherein a voltage level of the second positive voltage is more positive than a voltage level of the first positive voltage; a voltage boosting circuit configured to generate a negatively boosted voltage in response to a second clock signal; and a charge transfer transistor having a drain terminal coupled to receive said negatively boosted voltage and a source terminal coupled to an output node, wherein a gate terminal of the charge transfer transistor is biased by the second positive voltage of the control signal to turn on and pass the negatively boosted voltage to the output node and generate said output voltage.

In an embodiment, a positive charge pump circuit is configured to generate an output voltage from an input voltage, wherein a positive voltage level of the output voltage is more positive than a voltage level of the input voltage. The positive charge pump circuit comprises: a negative bootstrapping circuit configured to generate a first control signal in response to a first clock signal, wherein the first control signal switches between a ground voltage and a negative voltage; a positive bootstrapping circuit configured to generate a second control signal in response to said first clock signal, wherein the second control signal switches between a first positive voltage and a second positive voltage, wherein a voltage level of the second positive voltage is more positive than a voltage level of the first positive voltage; a voltage boosting circuit configured to generate a positively boosted voltage in response to a second clock signal at an intermediate node; a first charge transfer transistor having a drain terminal coupled to said intermediate node and a source terminal coupled to the input voltage, wherein a gate terminal of the first charge transfer transistor is biased by the second positive voltage of the second control signal to turn on in support of the voltage boosting circuit; and a second charge transfer transistor having a drain terminal coupled to said intermediate node and a source terminal coupled to an output node, wherein a gate terminal of the second charge transfer transistor is biased by the negative voltage of the first control signal to turn on and pass the positively boosted voltage to the output node and generate said output voltage.

In an embodiment, a negative charge pump circuit is configured to generate an output voltage from an input voltage, wherein a negative voltage level of the output voltage is more negative than a voltage level of the input voltage. The negative charge pump circuit comprises: a negative bootstrapping circuit configured to generate a first control signal in response to a first clock signal, wherein the first control signal switches between a ground voltage and a negative voltage; a positive bootstrapping circuit configured to generate a second control signal in response to said first clock signal, wherein the second control signal switches between a first positive voltage and a second positive voltage, wherein a voltage level of the second positive voltage is more positive than a voltage level of the first positive voltage; a voltage boosting circuit configured to generate a negatively boosted voltage in response to a second clock signal at an intermediate node; a first charge transfer transistor having a drain terminal coupled to said intermediate node and a source terminal coupled to the input voltage, wherein a gate terminal of the first charge transfer transistor is biased by the negative voltage of the first control signal to turn on in support of the voltage boosting circuit; and a second charge transfer transistor having a drain terminal coupled to said intermediate node and a source terminal coupled to an output node, wherein a gate terminal of the second charge transfer transistor is biased by the second positive voltage of the second control signal to turn on and pass the negatively boosted voltage to the output node and generate said output voltage.

BRIEF DESCRIPTION OF THE DRAWINGS

For a better understanding of the embodiments, reference will now be made by way of example only to the accompanying figures in which.

DETAILED DESCRIPTION

Figure 1A:
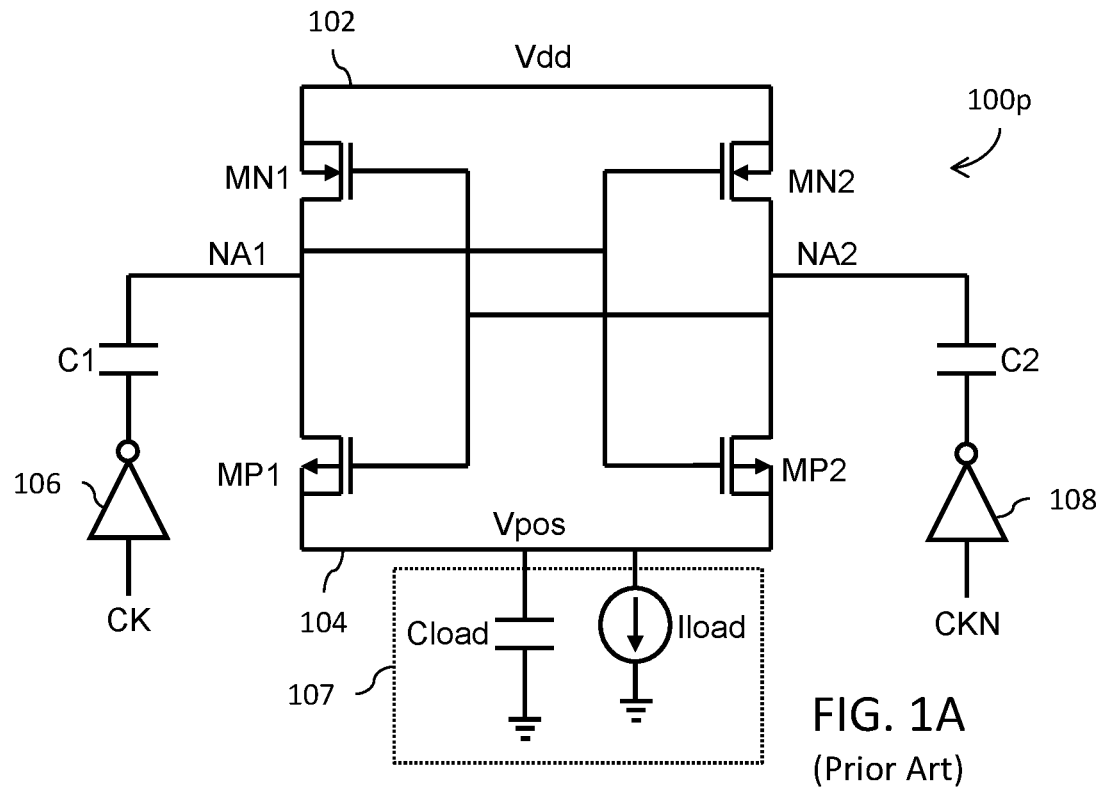
FIG. 1A is a circuit diagram for a positive charge pump circuit.
Figure 1B:
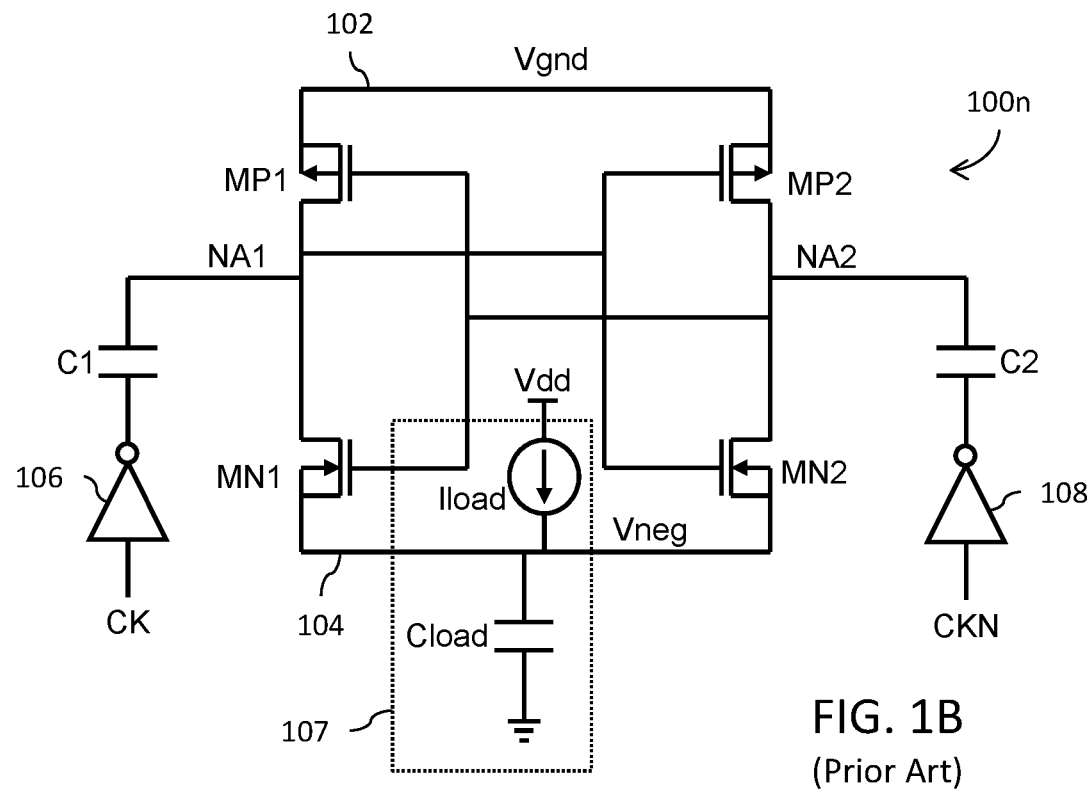
FIG. 1B is a circuit diagram for a negative charge pump circuit.
Figure 2A:
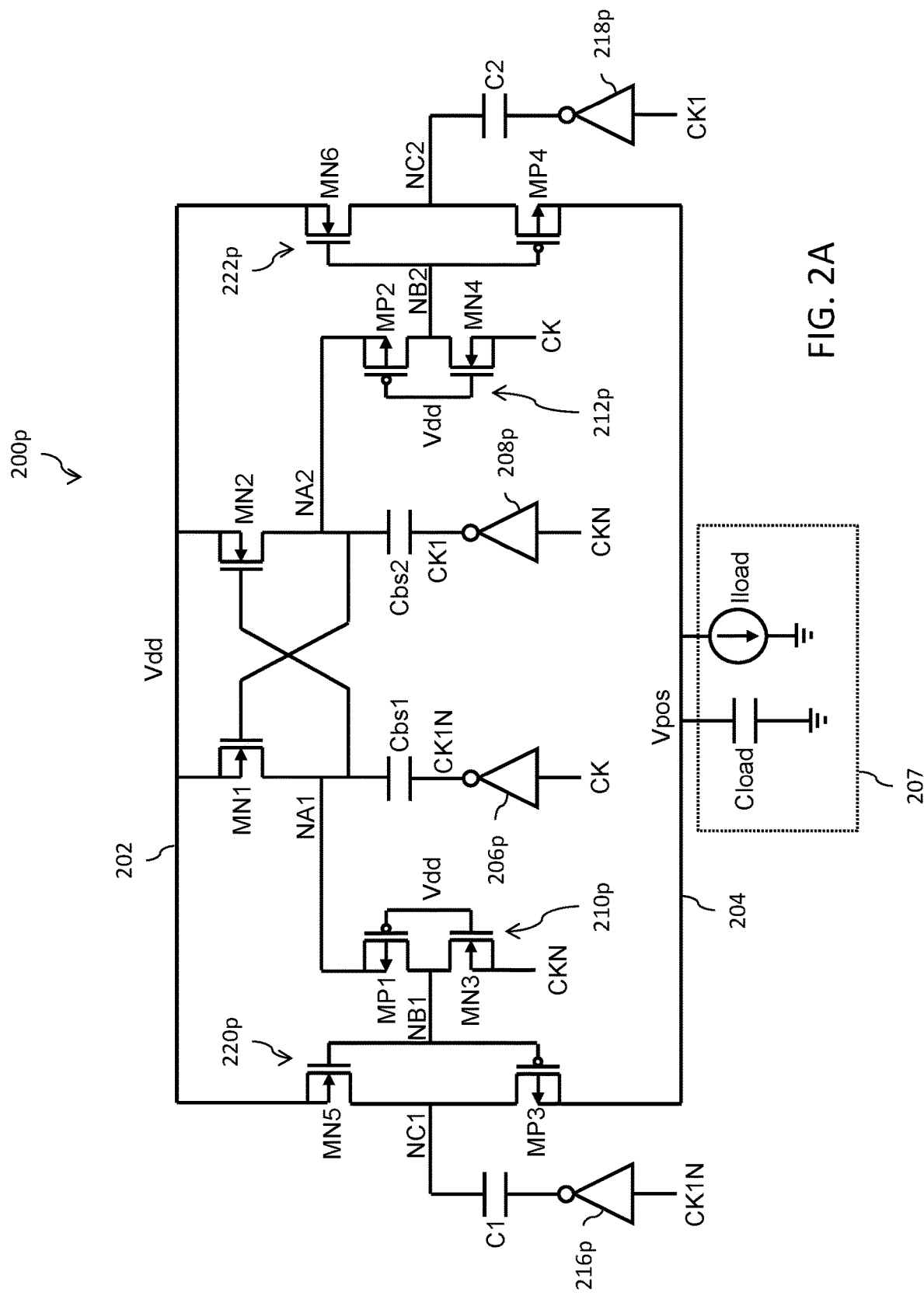
FIG. 2A is a circuit diagram for a positive charge pump circuit.
Figure 2B:
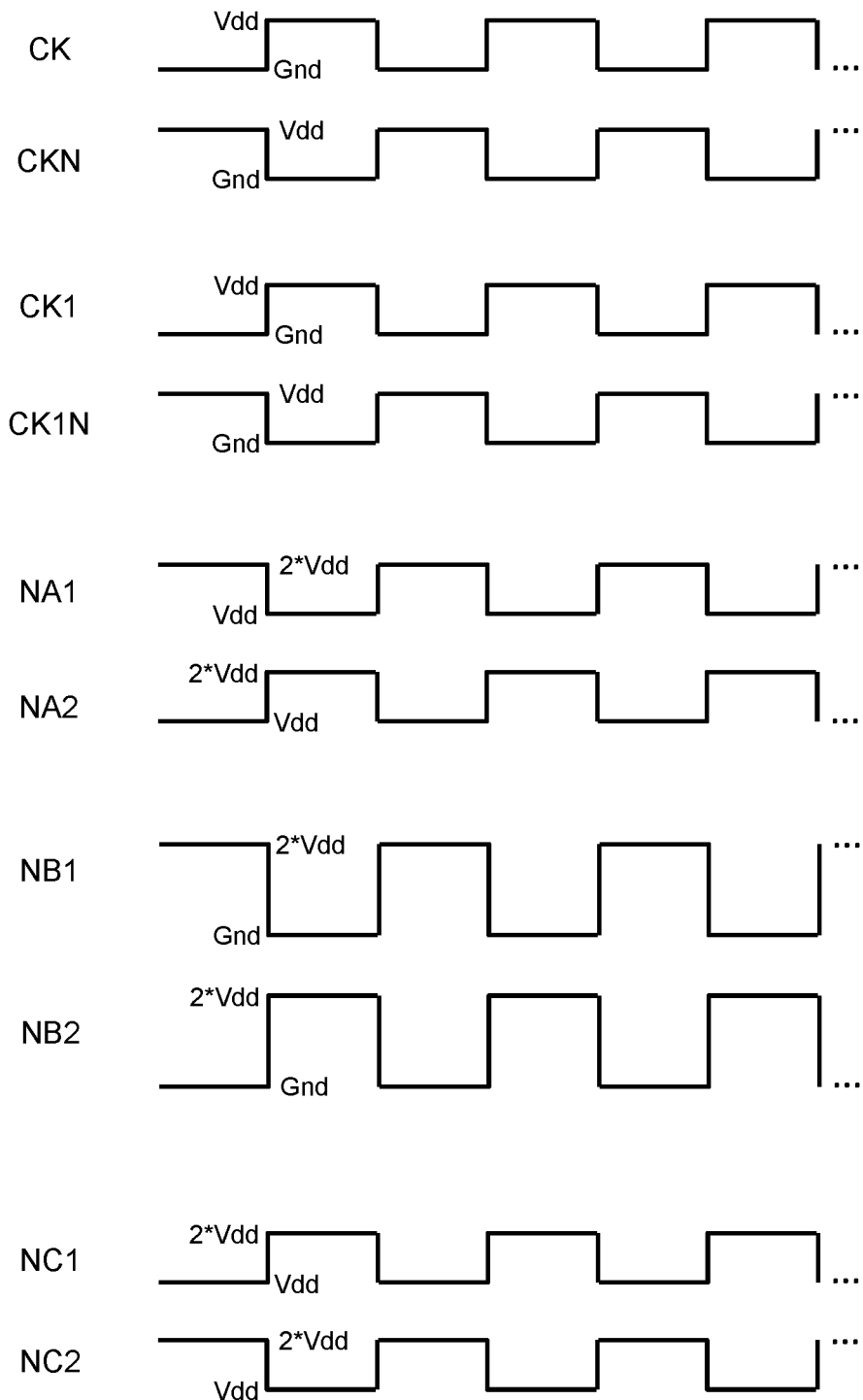
FIG. 2B illustrates operational waveforms for the circuit of FIG. 2A.
Figure 3A:
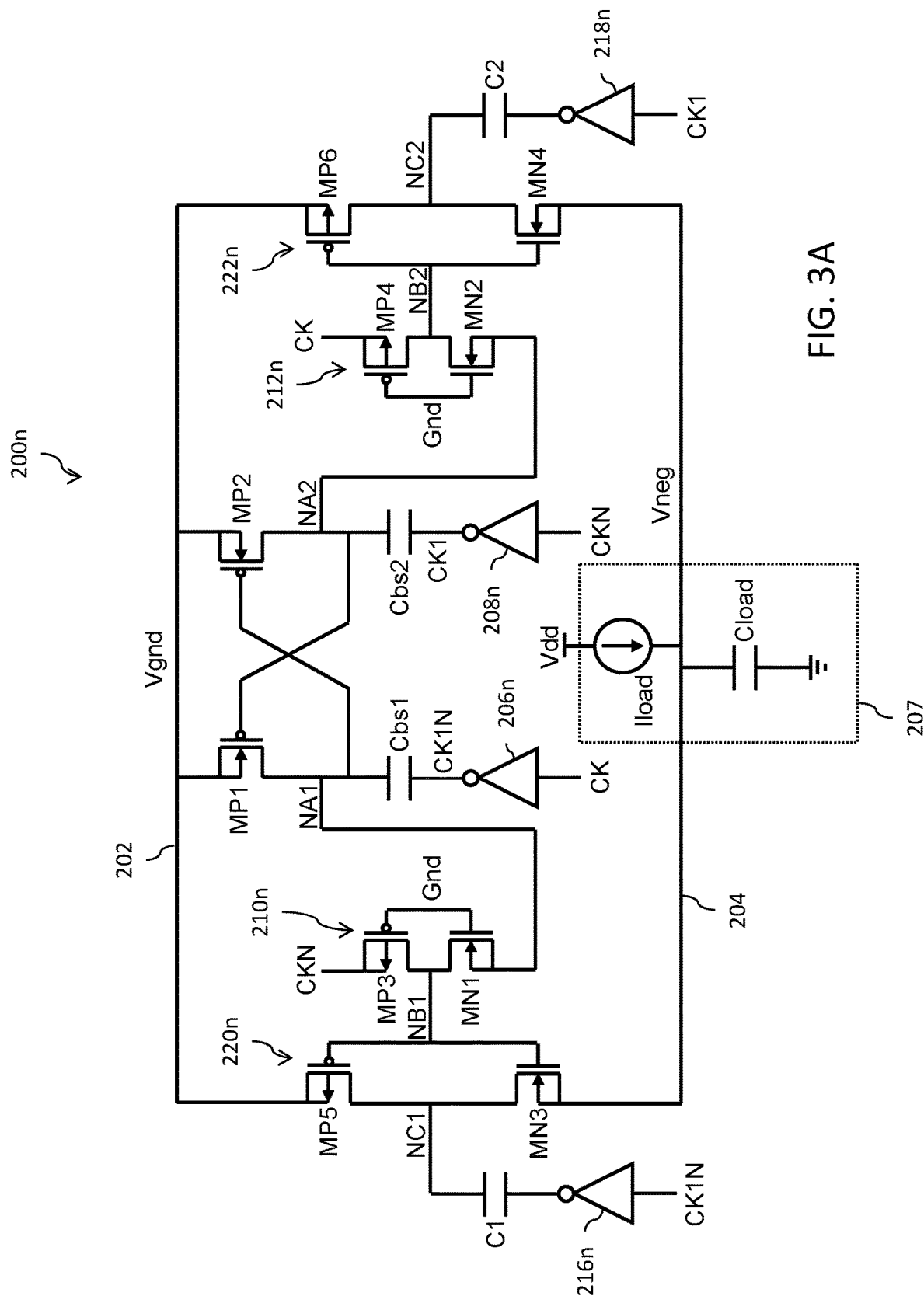
FIG. 3A is a circuit diagram for a negative charge pump circuit.
Figure 3B:
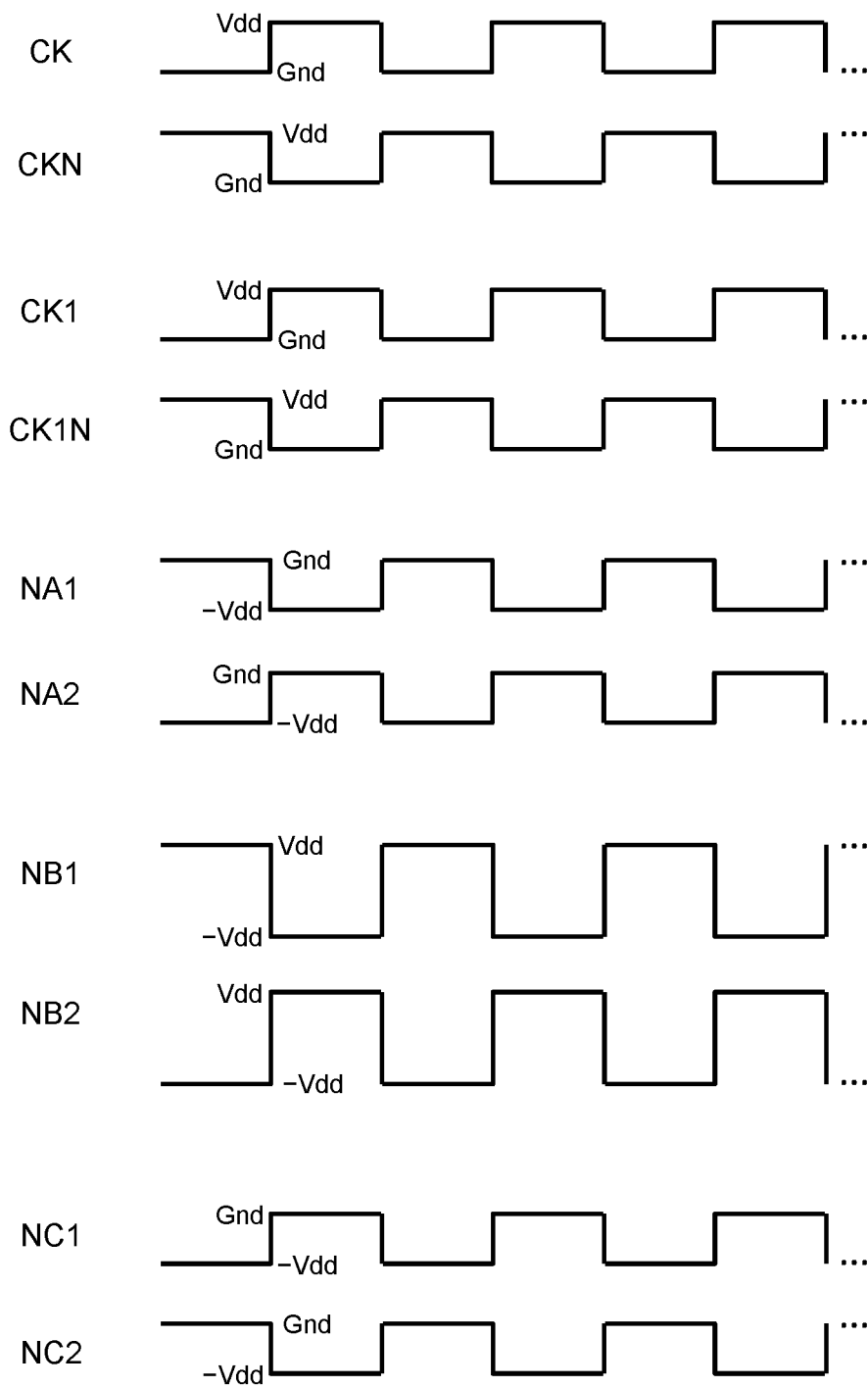
FIG. 3B illustrates operational waveforms for the circuit of FIG. 3A.
Figure 4A:
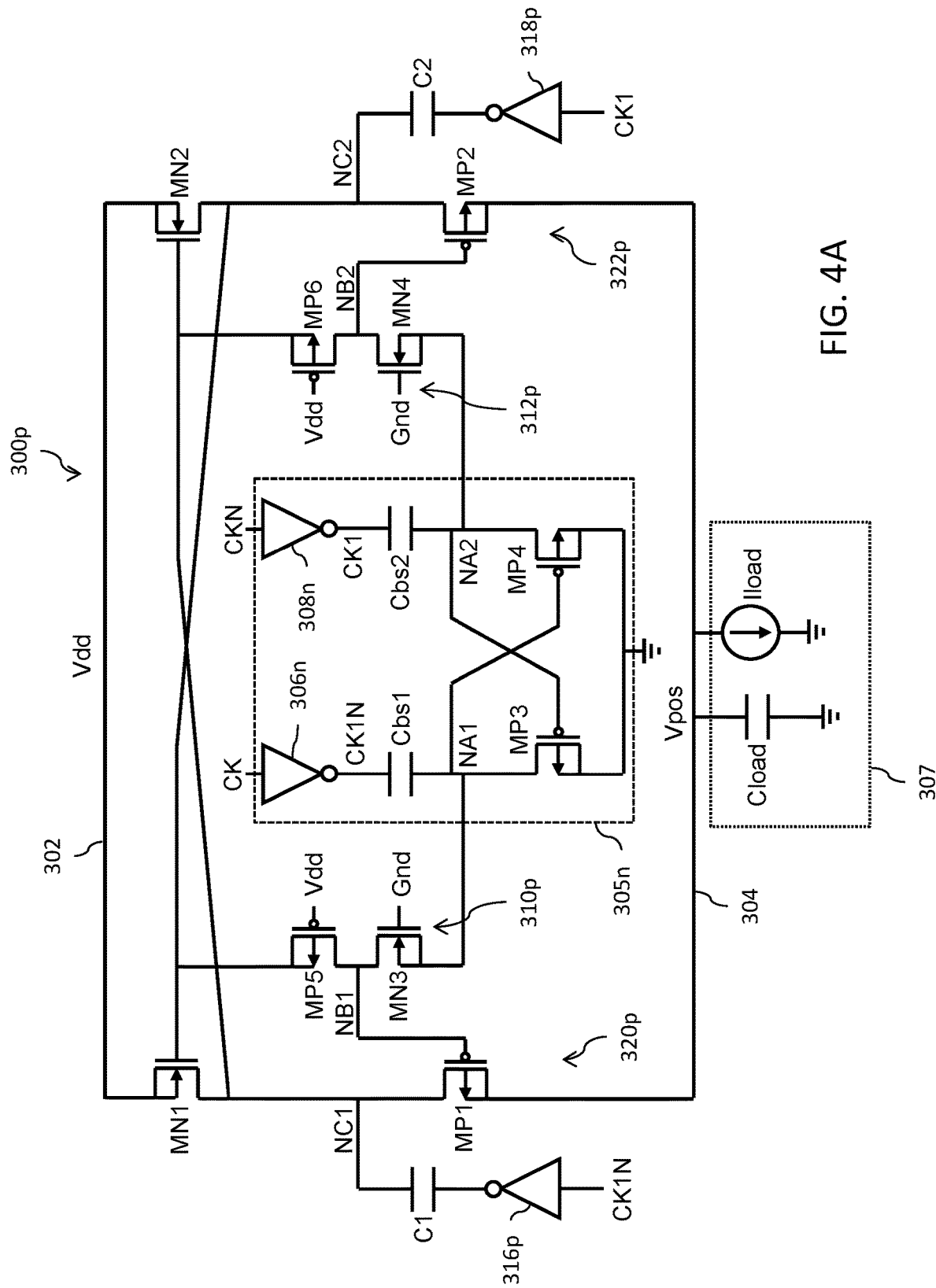
FIG. 4A is a circuit diagram for a positive charge pump circuit.

Reference is made to FIG. 4A showing a circuit diagram for a positive charge pump circuit 300$p$. The circuit 300$p$ includes an n-channel MOS transistor MN1 having a source terminal coupled to supply node 302 and a drain terminal coupled to intermediate node NC1 and an n-channel MOS transistor MN2 having a source terminal coupled to supply node 302 and a drain terminal coupled to intermediate node NC2. The transistors MN1 and MN2 are cross-coupled with the gate terminal of transistor MN1 coupled to the drain terminal of transistor MN2 at node NC2 and the gate terminal of transistor MN2 coupled to the drain terminal of transistor MN1 at node NC1. The circuit 300$p$ further includes a p-channel MOS transistor MP1 having a source terminal coupled to output node 304 and a drain terminal coupled to node NC1 and a p-channel MOS transistor MP2 having a source terminal coupled to output node 304 and a drain terminal coupled to intermediate node NC2. The transistors MN1 and MP1 form a CMOS switching circuit 320$p$ and the transistors MN2 and MP2 form a CMOS switching circuit 322$p$.

The positive charge pump circuit 300$p$ further includes a negative bootstrapping circuit 305$n$ including a p-channel MOS transistor MP3 having a source terminal coupled to a ground node and a drain terminal coupled to intermediate node NA1 and a p-channel MOS transistor MP4 having a source terminal coupled to the ground node and a drain terminal coupled to intermediate node NA2. The transistors MP3 and MP4 are cross-coupled with the gate terminal of transistor MP3 coupled to the drain terminal of transistor MP4 at node NA2 and the gate terminal of transistor MP4 coupled to the drain terminal of transistor MP3 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 306$n$ powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 308n powered from the positive supply voltage Vdd and receiving clock signal CKN as an input.

A CMOS switching circuit 310p has a first terminal coupled to receive the positive supply voltage Vdd, a second terminal coupled to receive the ground voltage Gnd and a third terminal at intermediate node NB1. A source terminal of the p-channel MOS transistor MP5 in switching circuit 310p is coupled to the gate terminal of transistor MN1 in CMOS switching circuit 320p (i.e., to intermediate node NC2) and a source terminal of the n-channel MOS transistor MN3 in switching circuit 310p is coupled to intermediate node NA1 of the negative bootstrapping circuit 305n. The third terminal is at the common drains of transistors MP5 and MN3 which is connected to the gate terminal of the transistor MP1 in CMOS switching circuit 320p. The gate of transistor MP5 is coupled to the first terminal (Vdd) and the gate of transistor MN3 is coupled to the second terminal (Gnd).

A CMOS switching circuit 312p has a first terminal coupled to receive the positive supply voltage Vdd, a second terminal coupled to receive the ground voltage Gnd, and a third terminal at intermediate node NB2. A source terminal of the p-channel MOS transistor MP6 in switching circuit 312p is coupled to the gate terminal of transistor MN2 in CMOS switching circuit 322p (i.e., to intermediate node NC1) and a source terminal of the n-channel MOS transistor MN4 in switching circuit 312p is coupled to intermediate node NA2 of the negative bootstrapping circuit 305n. The third terminal is at the common drains of transistors MP6 and MN4. The gate of transistor MP6 is coupled to the first terminal (Vdd) and the gate of transistor MN4 is coupled to the second terminal (Gnd).

The circuits 310p and 312p with the bootstrapping circuit 305n form a bootstrap-based level shifting circuit.

A capacitor C1 has one terminal coupled to node NC1 and another terminal coupled to receive the logical inversion of the clock signal CK1N, that logical inversion being generated by a CMOS inverter circuit 316p powered from the positive supply voltage Vdd and receiving clock signal CK1N as an input. A capacitor C2 has one terminal coupled to node NC2 and another terminal coupled to receive a logical inversion of the clock signal CK1, that logical inversion being generated by a CMOS inverter circuit 318p powered from the positive supply voltage Vdd and receiving clock signal CK1 as an input.

A load 307 of the circuit 300p is schematically represented by a load capacitor Cload having one terminal coupled to output node 304 and a second terminal coupled to the ground node and a current source Iload coupled between output node 304 and the ground node.

The supply node 302 is configured to receive the positive supply voltage Vdd. The output node 304 is configured with this positive charge pump circuit 300 to accordingly generate a multiplied positive output voltage Vpos, where Vpos is approximately 2*Vdd.

Figure 4B:
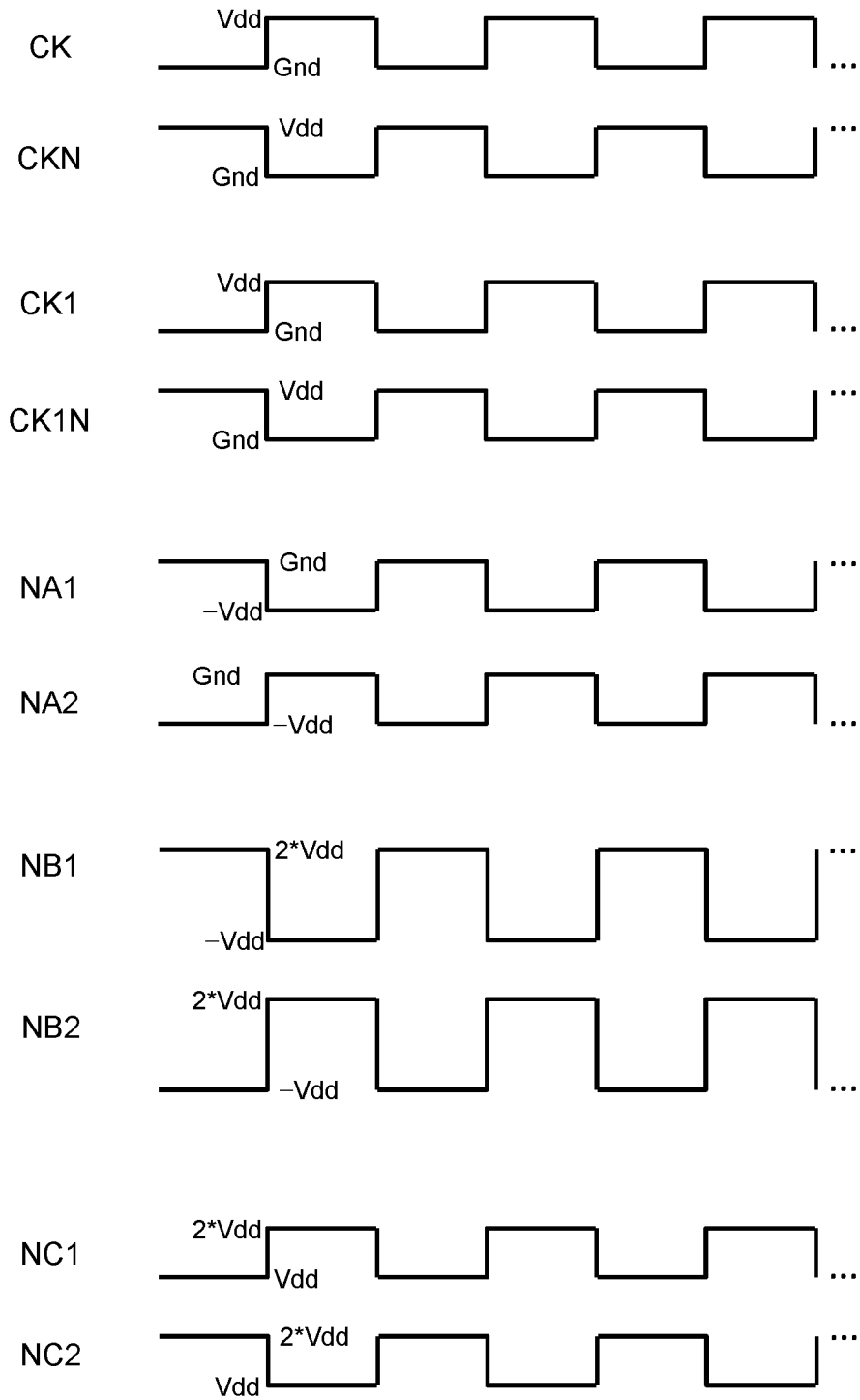
FIG. 4B illustrates operational waveforms for the circuit of FIG. 4A.

FIG. 4B shows the waveforms for the clock signals CK, CKN, CK1 and CK1N as well as the signals at nodes NA1, NA2, NB1, NB2, NC1 and NC2 for the operation of the circuit 300p of FIG. 4A. It will be noted that, for ease of understanding the operation of the circuit 300p, signal propagation delays are not shown in the FIG. 4B waveforms. It will be further noted that the voltage levels of the clock signals are idealized, and that as implemented the voltages will be substantially equal to (for example, within 1-20%), but not necessarily equal to, the ideal ±Vdd and 2*Vdd voltage levels.

The circuitry formed by transistors MP3, MP4, bootstrap capacitors Cbs1, Cbs2 and inverters 306n, 308n is a negative bootstrapping circuit that functions in response to the clock signals CK, CKN referenced to the power supply Vdd and ground to generate clock signals at nodes NA1, NA2 referenced to −Vdd and ground. When clock signal CKN is logic low (Gnd), the clock signal CK1 output by inverter 308n will be logic high (Vdd). Transistor MP4 turns on because node NA1 is boosted through capacitor Cbs1 to the −Vdd voltage level (i.e., turned on because the gate voltage of transistor MP4 is less than ground at the source terminal by more than Vth) and the bootstrap capacitor Cbs2 is charged at node NA2 to the ground voltage level. In the next phase of the clock signals, the clock signal CKN is logic high and clock signal CK1 output by inverter 308n will be logic low. Transistor M4 turns off because node NA1 is at the ground voltage level (i.e., turns off because the gate voltage of transistor MP4 is equal to the source voltage ground and thus does not exceed Vth) and the voltage at node NA2 is boosted through the bootstrap ground voltage stored on capacitor Cbs2 to the −Vdd voltage level. A similar process occurs in response to the phases of the clock signals CK and CK1N.

The circuitry formed by capacitor C1, C2 and inverters 316p, 318p functions in response to the clock signals CK1, CK1N referenced to the power supply Vdd and ground to generate clock signals at nodes NC1, NC2 referenced to 2*Vdd and Vdd. Consider the following operation with respect to the circuit with capacitor C1 and inverter 316p: when clock signal CK1N is logic high, the output of the inverter 316p is logic low. At the same time, as will be discussed below, transistor MN1 is turned on and the capacitor C1 is charged to the Vdd voltage level. In the next phase of the clock signals, clock signal CK1N is logic low, and the output of the inverter 316p is logic high. The voltage at node NC1 is boosted through capacitor C1 to the 2*Vdd voltage level. A similar process occurs with respect to the circuit with capacitor C2 and inverter 318p in response to the phases of the clock signal CK1.

The circuitry formed by the CMOS switching circuits 310p and 312p functions as a level shifting stage to shift the clock signals at nodes NA1, NA2 referenced to −Vdd and ground to generate clock signals at nodes NB1, NB2 referenced to −Vdd and +2*Vdd. Consider the following with respect to the circuit 312p operation: when node NA2 is at ground, transistor MN4 is turned off (i.e., because the gate voltage of transistor MN4 is equal to the source voltage ground and thus does not exceed Vth). At the same time, the voltage at node NC1 has been boosted by the operation of inverter 316p and capacitor C1, in response to clock CK1n, to the voltage level 2*Vdd. In this condition, transistor MP6 is turned on (i.e., because the gate voltage of transistor MP6 is less than the source terminal by more than Vth) and the voltage at node NB2 is driven to 2*Vdd. Conversely, when node NA2 is at −Vdd, transistor MN4 is turned on (i.e., because the gate voltage of transistor MN4 is less than the source terminal by more than Vth) and the voltage at node NB2 is driven to −Vdd. A similar process occurs with respect to the circuit 210p.

The circuitry formed by the CMOS switching circuits 320p and 322p functions as a charge transfer drive stage to selectively pass the 2*Vdd voltage at nodes NC1, NC2 to the output node 304 in order to drive the capacitive and current load 307. Consider the following with respect to the circuit 322p operation: when voltage at node NC2 is at Vdd because transistor MN2 is turned on, the voltage at node NB2 is at 2*Vdd. In this condition, the transistor MP2 is turned off (i.e., because the gate voltage of transistor MP2 is greater than the source voltage and thus does not exceed Vth). When the voltage at node NC2 is boosted to 2*Vdd, the voltage at node NB2 is at −Vdd and the transistor MP2 is turned on (i.e., the Vgs of transistor MP2 exceeds the Vth) to pass the 2*Vdd voltage level at node NC2 to the output node 304. A similar process occurs with respect to the circuit 320p in response to the opposite phases.

An advantage of the circuit implementation is an increase in the Vgs of the charge transfer switching transistors, especially in connection with the operation of transistors MP1 and MP2 when gate driven by −Vdd, in order to reduce the on-resistance (Rds_on).

Figure 4C:
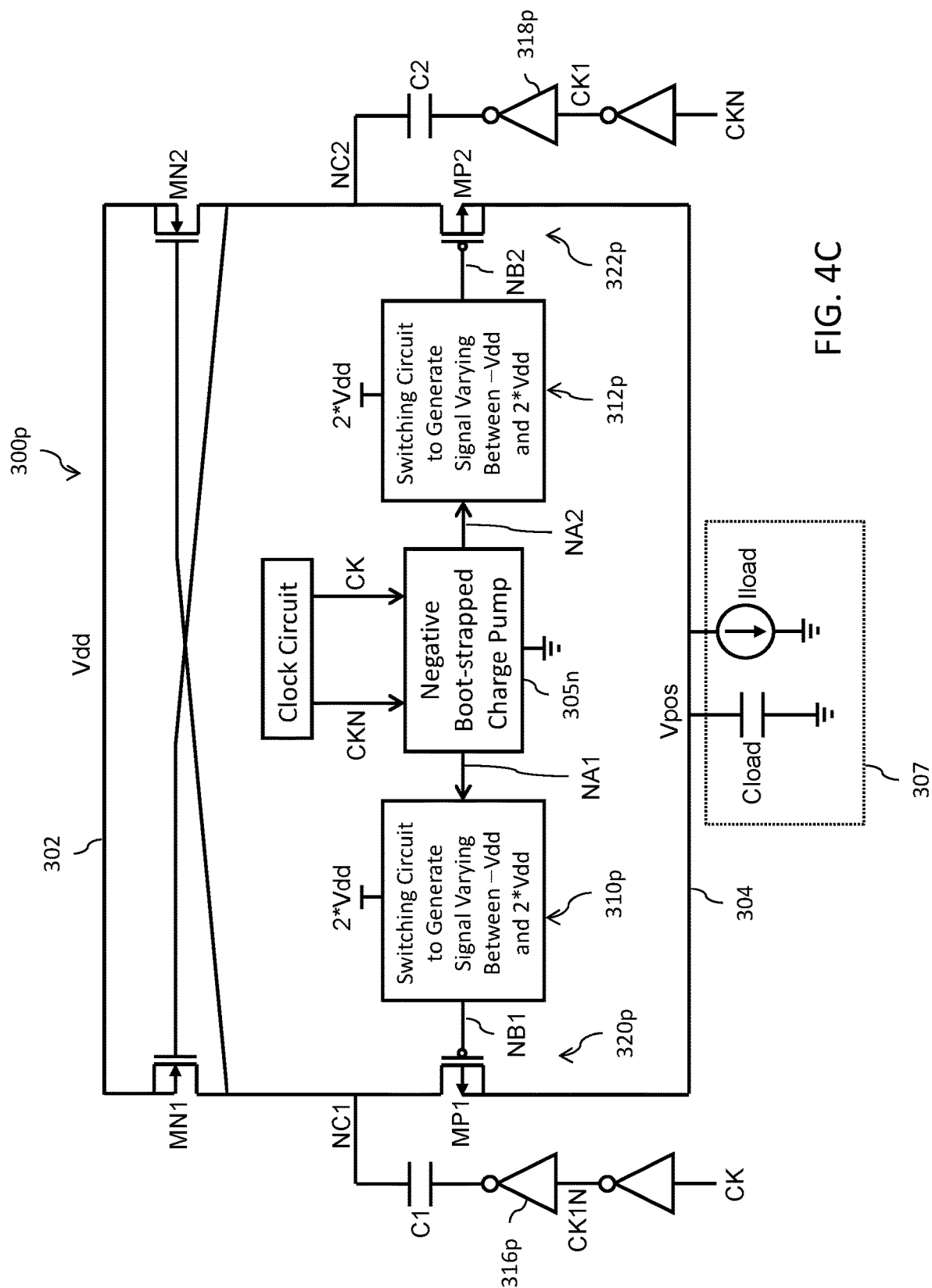
FIG. 4C shows a more generic circuit configuration for the positive charge pump circuit of FIG. 4A.

A more generic circuit configuration for the positive charge pump circuit 300p of FIG. 4A is shown in FIG. 4C. The circuit 300p is configured to increase the gate-to-source voltage (Vgs) of the charge transfer transistors (switches) MP1 and MP2 in order to reduce their "on" resistances. A negative voltage bootstrap circuit 305n generates a negative voltage (−Vdd) at nodes NA1 and NA2. This voltage is selectively switched in response to clock signals generated by the clock circuit for application to the gate terminals of the transistors MP1 and MP2 so as to provide boost. The gate drive signals for the transistors MP1 and MP2 alternate in response to the clock signals between −Vdd and 2*Vdd under the control of the switching circuits 310p and 312p. A boosted voltage of 2*Vdd is generated at nodes NC1 and NC2 and is passed by the transistors MP1 and MP2 at times when the gate terminal of transistors MP1 and MP2 is biased by the −Vdd voltage. The effective Vgs of the transistors MP1 and MP2 during the charge transfer phase is accordingly 3*Vdd, which results in a substantially reduced switch resistance.

Figure 5A:
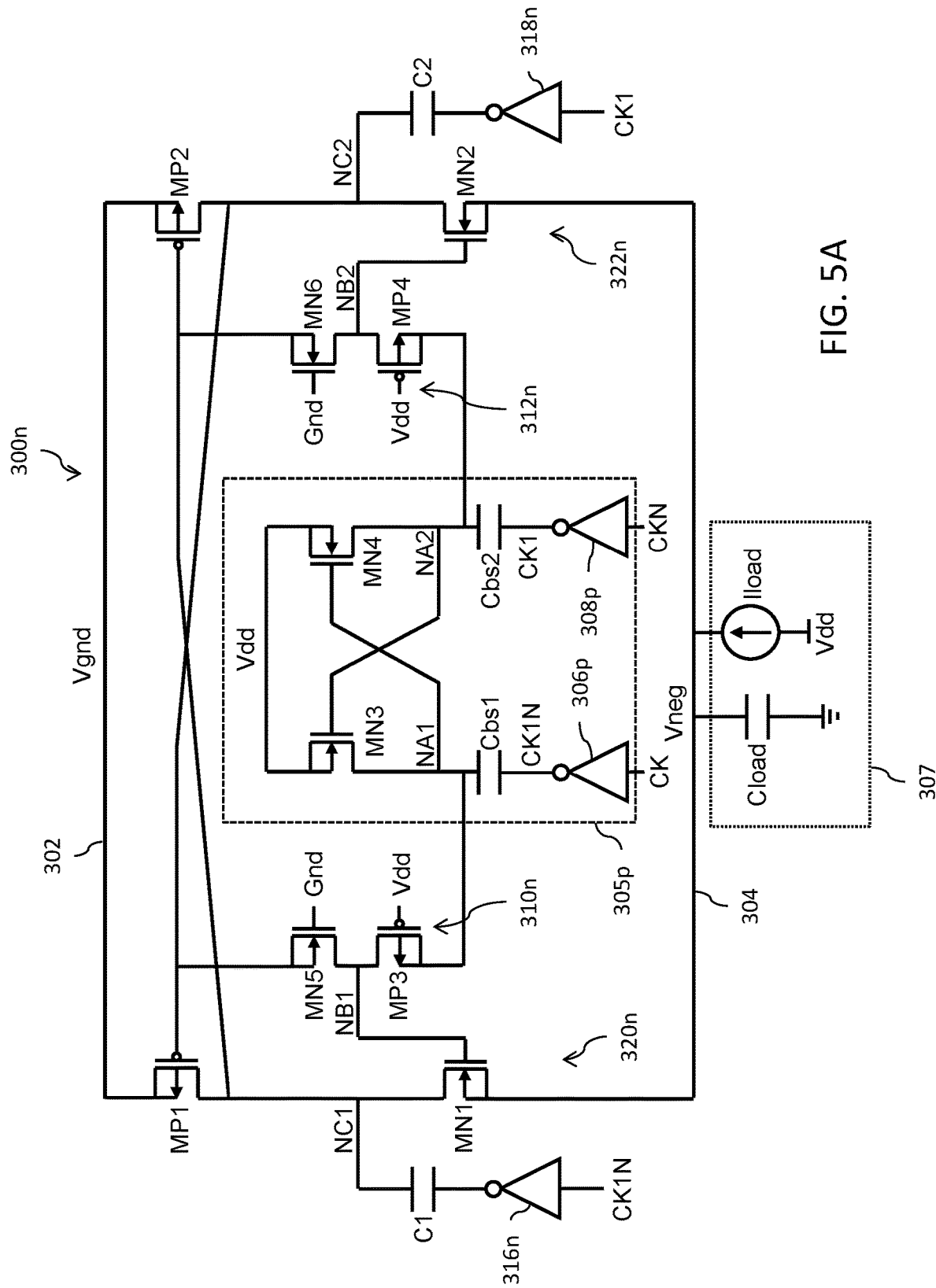
FIG. 5A is a circuit diagram for a negative charge pump circuit.

Reference is made to FIG. 5A showing a circuit diagram for a negative charge pump circuit 300n. The circuit 300n includes a p-channel MOS transistor MP1 having a source terminal coupled to supply node 302 and a drain terminal coupled to intermediate node NC1 and a p-channel MOS transistor MN2 having a source terminal coupled to supply node 302 and a drain terminal coupled to intermediate node NC2. The transistors MP1 and MP2 are cross-coupled with the gate terminal of transistor MP1 coupled to the drain terminal of transistor MP2 at node NC2 and the gate terminal of transistor MP2 coupled to the drain terminal of transistor MP1 at node NC1. The circuit 300n further includes an n-channel MOS transistor MN1 having a source terminal coupled to output node 304 and a drain terminal coupled to node NC1 and an n-channel MOS transistor MN2 having a source terminal coupled to output node 304 and a drain terminal coupled to intermediate node NC2. The transistors MP1 and MN1 form a CMOS switching circuit 320n and the transistors MP2 and MN2 form a CMOS switching circuit 322n.

The negative charge pump circuit 300n further includes a positive bootstrapping circuit 305p including an n-channel MOS transistor MN3 having a source terminal coupled to the supply voltage node Vdd and a drain terminal coupled to intermediate node NA1 and an n-channel MOS transistor MN4 having a source terminal coupled to the supply voltage node Vdd and a drain terminal coupled to intermediate node NA2. The transistors MN3 and MN4 are cross-coupled with the gate terminal of transistor MN3 coupled to the drain terminal of transistor MN4 at node NA2 and the gate terminal of transistor MN4 coupled to the drain terminal of transistor MN3 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 306p powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 308p powered from the positive supply voltage Vdd and receiving clock signal CKN as an input.

A CMOS switching circuit 310n has a first terminal coupled to receive the ground voltage Gnd, a second terminal coupled to receive the supply voltage Vdd and a third terminal at intermediate node NB1. A source terminal of the n-channel MOS transistor MN5 in switching circuit 310n is coupled to the gate terminal of transistor MP1 in CMOS switching circuit 320n (i.e., to intermediate node NC2) and a source terminal of the p-channel MOS transistor MP3 in switching circuit 310n is coupled to intermediate node NA1 of the positive bootstrapping circuit 305p. The third terminal is at the common drains of transistors MN5 and MP3 which is connected to the gate terminal of the transistor MN1 in CMOS switching circuit 320n. The gate of transistor MN5 is coupled to the first terminal (Gnd) and the gate of transistor MP3 is coupled to the second terminal (Vdd).

A CMOS switching circuit 312n has a first terminal coupled to receive the ground voltage Gnd, a second terminal coupled to receive the supply voltage Vdd and a third terminal at intermediate node NB2. A source terminal of the n-channel MOS transistor MN6 in switching circuit 312n is coupled to the gate terminal of transistor MP2 in CMOS switching circuit 322n (i.e., to intermediate node NC1) and a source terminal of the p-channel MOS transistor MP4 in switching circuit 312n is coupled to intermediate node NA2 of the positive bootstrapping circuit 305p. The third terminal is at the common drains of transistors MN6 and MP4. The gate of transistor MN6 is coupled to the first terminal (Gnd) and the gate of transistor MP4 is coupled to the second terminal (Vdd).

The circuits 310n and 312n with the bootstrapping circuit 305p form a bootstrap-based level shifting circuit.

A capacitor C1 has one terminal coupled to node NC1 and another terminal coupled to receive the logical inversion of the clock signal CK1N, that logical inversion being generated by a CMOS inverter circuit 316n powered from the positive supply voltage Vdd and receiving clock signal CK1N as an input. A capacitor C2 has one terminal coupled to node NC2 and another terminal coupled to receive a logical inversion of the clock signal CK1, that logical inversion being generated by a CMOS inverter circuit 318n powered from the positive supply voltage Vdd and receiving clock signal CK1 as an input.

A load 307 of the circuit 300n is schematically represented by a load capacitor Cload having one terminal coupled to output node 304 and a second terminal coupled to the ground node and a current source Iload coupled between output node 304 and the supply voltage Vdd.

The supply node 302 is configured to receive the ground voltage Vgnd. The output node 304 is configured with this negative charge pump circuit 300 to accordingly generate a multiplied negative output voltage Vneg, where Vneg is approximately −Vdd.

Figure 5B:
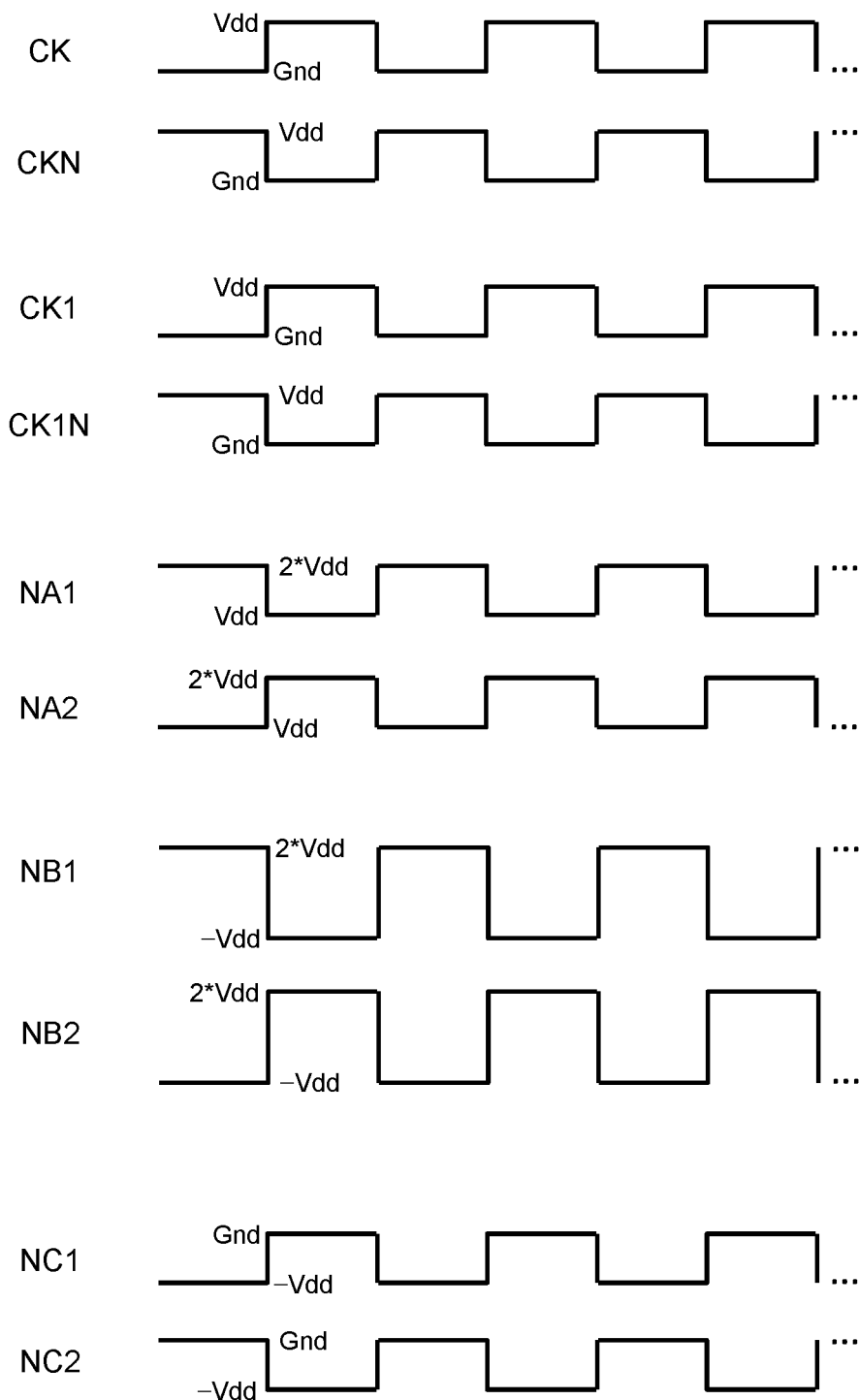
FIG. 5B illustrates operational waveforms for the circuit of FIG. 5A.

FIG. 5B shows the waveforms for the clock signals CK, CKN, CK1 and CK1N as well as the signals at nodes NA1, NA2, NB1, NB2, NC1 and NC2 for the operation of the circuit 300n of FIG. 5A. It will be noted that, for ease of understanding the operation of the circuit 300n, signal propagation delays are not shown in the FIG. 5B waveforms. It will be further noted that the voltage levels of the clock signals are idealized, and that as implemented the voltages will be substantially equal to (for example, within 1-20%), but not necessarily equal to, the ideal ±Vdd and 2*Vdd voltage levels.

The circuitry formed by transistors MN3, MN4, bootstrap capacitors Cbs1, Cbs2 and inverters 306p, 308p is a positive bootstrapping circuit that functions in response to the clock signals CK, CKN referenced to the power supply Vdd and ground to generate clock signals at nodes NA1, NA2 referenced to 2*Vdd and Vdd. When clock signal CK is logic high (Vdd), the clock signal CK1N output by inverter 306p will be logic low (Gnd). Transistor MN3 turns on because node NA2 is boosted through capacitor Cbs2 to the 2*Vdd voltage level (i.e., turned on because the gate voltage of transistor MN3 exceeds Vdd at the source terminal by more than Vth) and the bootstrap capacitor Cbs1 is charged to the Vdd voltage level. In the next phase of the clock signals, the clock signal CK is logic low and clock signal CK1N output by inverter 306p will be logic high. Transistor MN3 turns off because node NA2 is at the Vdd voltage level (i.e., turns off because the gate voltage of transistor MN1 is equal to the source voltage Vdd and thus does not exceed Vth) and the voltage at node NA1 is boosted through the bootstrap voltage Vdd stored on capacitor Cbs1 to the 2*Vdd voltage level. A similar process occurs in response to the phases of the clock signals CKN and CK1.

The circuitry formed by capacitor C1, C2 and inverters 316n, 318n functions in response to the clock signals CK1, CK1N referenced to the power supply Vdd and ground to generate clock signals at nodes NC1, NC2 referenced to –Vdd and ground. Consider the following operation with respect to the circuit with capacitor C2 and inverter 318n: when clock signal CK1 is logic low, the output of the inverter 318n is logic high. At the same time, as will be discussed below, transistor MP2 is turned on and the capacitor C2 is discharged to the ground voltage level. In the next phase of the clock signals, clock signal CK1 is logic high, and the output of the inverter 318n is logic low. The voltage at node NC2 is boosted through capacitor C2 to the –Vdd voltage level. A similar process occurs with respect to the circuit with capacitor C1 and inverter 316n in response to the phases of the clock signal CK1N.

The circuitry formed by the CMOS switching circuits 310n and 312n functions as a level shifting stage to shift the clock signals at nodes NA1, NA2 referenced to Vdd and +2*Vdd to generate clock signals at nodes NB1, NB2 referenced to –Vdd and +2*Vdd. Consider the following with respect to the circuit 312n operation: when node NA2 is at Vdd, transistor MP4 is turned off (i.e., because the gate voltage of transistor MP4 is equal to the source voltage and thus does not exceed Vth). At the same time, the voltage at node NC1 has been boosted by the operation of inverter 316n and capacitor C1, in response to clock CK1N, to the voltage level –Vdd. In this condition, transistor MN6 is turned on (i.e., because the gate voltage of transistor MP6 is less than the source terminal by more than Vth) and the voltage at node NB2 is driven to –Vdd. Conversely, when node NA2 is at 2*Vdd, transistor MP4 is turned on (i.e., because the gate voltage of transistor MP4 is less than the source terminal by more than Vth) and the voltage at node NB2 is driven to 2*Vdd. A similar process occurs with respect to the circuit 310n.

The circuitry formed by the CMOS switching circuits 320n and 322n functions as a charge transfer drive stage to selectively pass the –Vdd voltage at nodes NC1, NC2 to the output node 304 in order to drive the capacitive and current load 307. Consider the following with respect to the circuit 322n operation: when voltage at node NC2 is at ground Gnd because transistor MP2 is turned on, the voltage at node NB2 is at –Vdd. In this condition, the transistor MN2 is turned off (i.e., because the gate voltage of transistor MN2 does not exceed Vth). When the voltage at node NC2 is boosted to –Vdd, the voltage at node NB2 is at 2*Vdd and the transistor MN2 is turned on (i.e., the Vgs of transistor MN2 exceeds the Vth) to pass the –Vdd voltage level at node NC2 to the output node 304. A similar process occurs with respect to the circuit 320n in response to the opposite phases.

An advantage of the circuit implementation is an increase in the Vgs of the charge transfer switching transistors, especially in connection with the operation of transistors MN1 and MN2 when gate driven by +2*Vdd, in order to reduce the on-resistance (Rds_on).

Figure 5C:
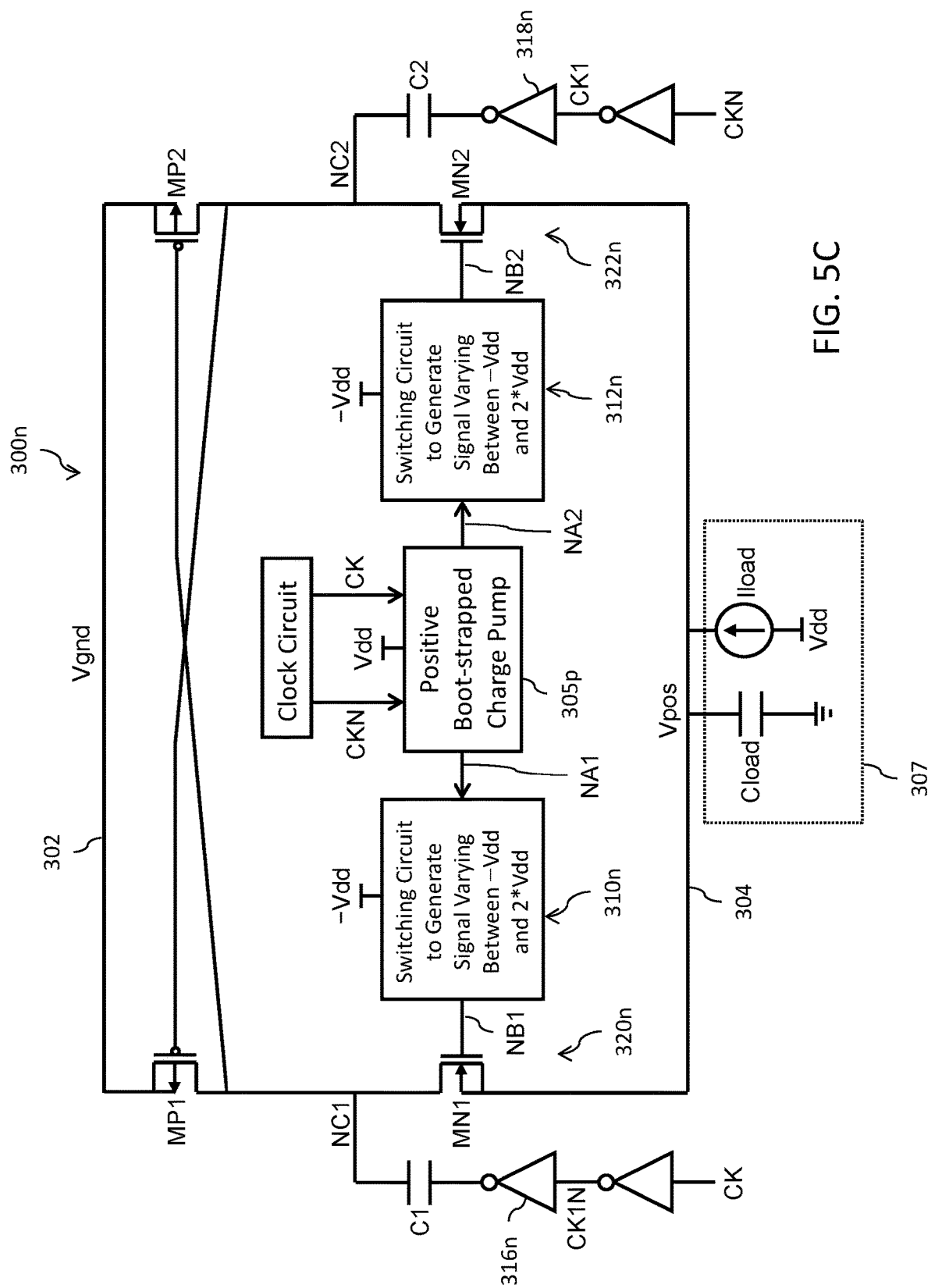
FIG. 5C shows a more generic circuit configuration for the negative charge pump circuit of FIG. 5A.

A more generic circuit configuration for the negative charge pump circuit 300n of FIG. 5A is shown in FIG. 5C. The circuit 300n is configured to increase the gate-to-source voltage (Vgs) of the charge transfer transistors (switches) MN1 and MN2 in order to reduce their "on" resistances. A positive voltage bootstrap circuit 305p generates a positive voltage (2*Vdd) at nodes NA1 and NA2. This voltage is selectively switched in response to clock signals generated by the clock circuit for application to the gate terminals of the transistors MN1 and MN2 so as to provide boost. The gate drive signals for the transistors MN1 and MN2 alternate between –Vdd and 2*Vdd under the control of the switching circuits 310n and 312n. A boosted voltage of –Vdd is generated at nodes NC1 and NC2 and is passed by the transistors MN1 and MN2 at times when the gate terminal of transistors MN1 and MN2 is biased by the 2*Vdd voltage. The effective Vgs of the transistors MN1 and MN2 during the charge transfer phase is accordingly 3*Vdd, which results in a substantially reduced switch resistance.

Figure 6A:
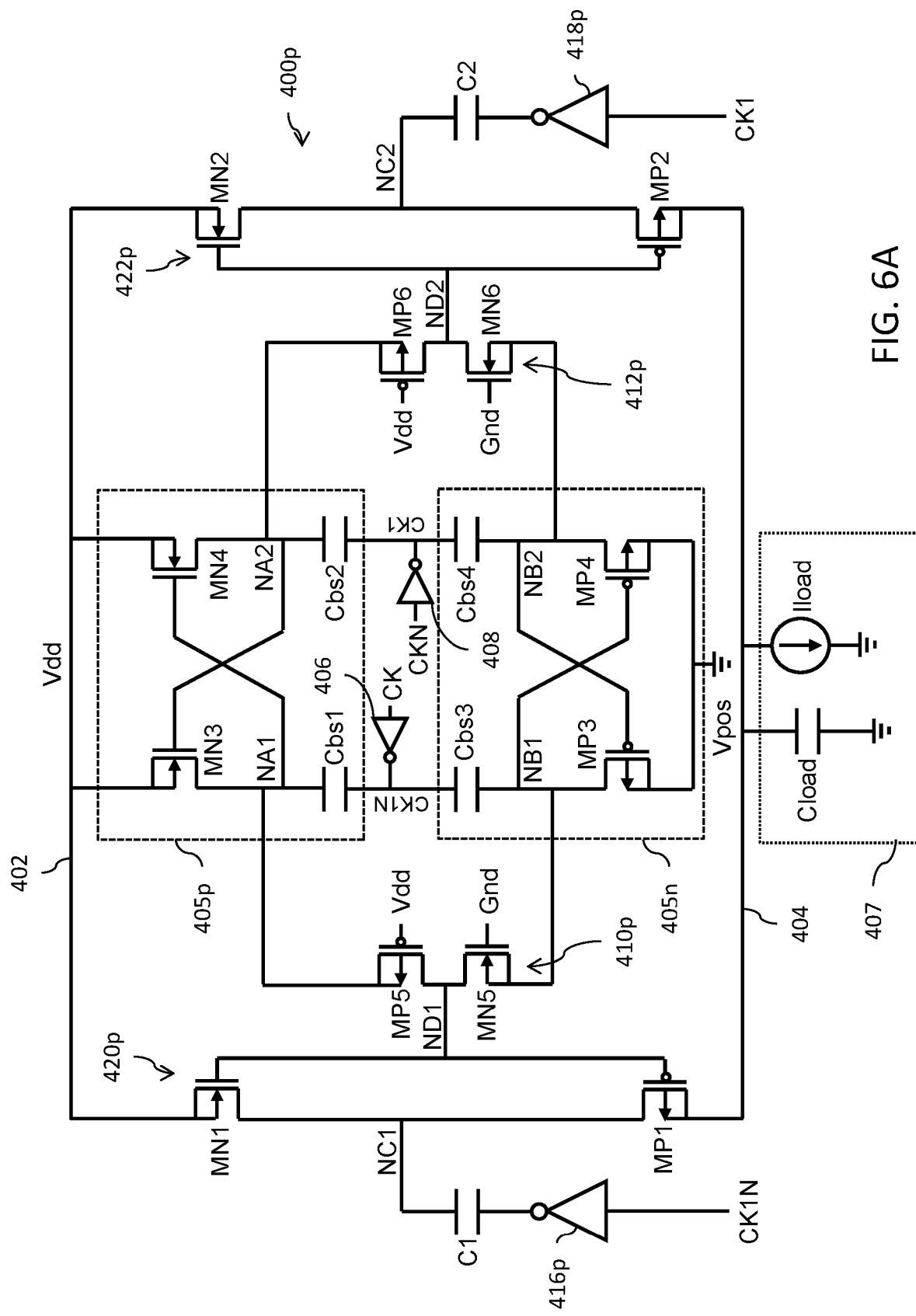
FIG. 6A is a circuit diagram for a positive charge pump circuit.

Reference is made to FIG. 6A showing a circuit diagram for a positive charge pump circuit 400p. The circuit 400p includes an n-channel MOS transistor MN1 having a source terminal coupled to supply node 402 and a drain terminal coupled to intermediate node NC1 and an n-channel MOS transistor MN2 having a source terminal coupled to supply node 402 and a drain terminal coupled to intermediate node NC2. The circuit 400p further includes a p-channel MOS transistor MP1 having a source terminal coupled to output node 404 and a drain terminal coupled to node NC1 and a p-channel MOS transistor MP2 having a source terminal coupled to output node 404 and a drain terminal coupled to intermediate node NC2. The gates of the transistors MN1 and MP1 are coupled to node ND1, and the gates of the transistors MN2 and MP2 are coupled to node ND2. The transistors MN1 and MP1 form a CMOS switching circuit 420p and the transistors MN2 and MP2 form a CMOS switching circuit 422p.

The positive charge pump circuit 400p further includes a positive bootstrapping circuit 405p including an n-channel MOS transistor MN3 having a source terminal coupled to the supply voltage node Vdd and a drain terminal coupled to intermediate node NA1 and an n-channel MOS transistor MN4 having a source terminal coupled to the supply voltage node Vdd and a drain terminal coupled to intermediate node NA2. The transistors MN3 and MN4 are cross-coupled with the gate terminal of transistor MN3 coupled to the drain terminal of transistor MN4 at node NA2 and the gate terminal of transistor MN4 coupled to the drain terminal of transistor MN3 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 406 powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 408 powered from the positive supply voltage Vdd and receiving clock signal CKN as an input.

The positive charge pump circuit 400p further includes a negative bootstrapping circuit 405n including a p-channel MOS transistor MP3 having a source terminal coupled to a ground node and a drain terminal coupled to intermediate node NB1 and a p-channel MOS transistor MP4 having a source terminal coupled to the ground node and a drain terminal coupled to intermediate node NB2. The transistors MP3 and MP4 are cross-coupled with the gate terminal of transistor MP3 coupled to the drain terminal of transistor MP4 at node NB2 and the gate terminal of transistor MP4 coupled to the drain terminal of transistor MP3 at node NB1.

A bootstrap capacitor Cbs3 has one terminal coupled to node NB1 and another terminal coupled to receive the logical inversion of the clock signal CK generated by CMOS inverter circuit 406. A bootstrap capacitor Cbs4 has one terminal coupled to node NB2 and another terminal coupled to receive the logical inversion of the clock signal CKN generated by CMOS inverter circuit 408.

A CMOS switching circuit 410p has a first terminal coupled to receive the positive supply voltage Vdd, a second terminal coupled to receive the ground voltage Gnd and a third terminal at intermediate node ND1. A source terminal of the p-channel MOS transistor MP5 in switching circuit 410p is coupled to node NA1 at the output of the positive bootstrapping circuit 405p and a source terminal of the n-channel MOS transistor MN5 in switching circuit 410p is coupled to intermediate node NB1 at the output of the negative bootstrapping circuit 405n. The third terminal is at the common drains of transistors MP5 and MN5 which is connected to the gate terminals of the transistors MP1 and MN1 in CMOS switching circuit 420p. The gate of transistor MP5 is coupled to the first terminal (Vdd) and the gate of transistor MN5 is coupled to the second terminal (Gnd).

A CMOS switching circuit 412p has a first terminal coupled to receive the positive supply voltage Vdd, a second terminal coupled to receive the ground voltage Gnd, and a third terminal at intermediate node ND2. A source terminal of the p-channel MOS transistor MP6 in switching circuit 412p is coupled to node NA2 at the output of the positive bootstrapping circuit 405p and a source terminal of the n-channel MOS transistor MN6 in switching circuit 412p is coupled to intermediate node NB2 at the output of the negative bootstrapping circuit 405n. The third terminal is at the common drains of transistors MP6 and MN6 which is connected to the gate terminals of the transistors MP2 and MN2 in CMOS switching circuit 422p. The gate of transistor MP6 is coupled to the first terminal (Vdd) and the gate of transistor MN6 is coupled to the second terminal (Gnd).

The circuits 410p and 412p with the bootstrapping circuits 405p and 405n form a bootstrap-based level shifting circuit.

A capacitor C1 has one terminal coupled to node NC1 and another terminal coupled to receive the logical inversion of the clock signal CK1N, that logical inversion being generated by a CMOS inverter circuit 416p powered from the positive supply voltage Vdd and receiving clock signal CK1N as an input. A capacitor C2 has one terminal coupled to node NC2 and another terminal coupled to receive a logical inversion of the clock signal CK1, that logical inversion being generated by a CMOS inverter circuit 418p powered from the positive supply voltage Vdd and receiving clock signal CK1 as an input.

A load 407 of the circuit 400p is schematically represented by a load capacitor Cload having one terminal coupled to output node 404 and a second terminal coupled to the ground node and a current source Iload coupled between output node 404 and the ground node.

The supply node 402 is configured to receive the positive supply voltage Vdd. The output node 404 is configured with this positive charge pump circuit 400p to accordingly generate a multiplied positive output voltage Vpos, where Vpos is approximately 2*Vdd.

Figure 6B:
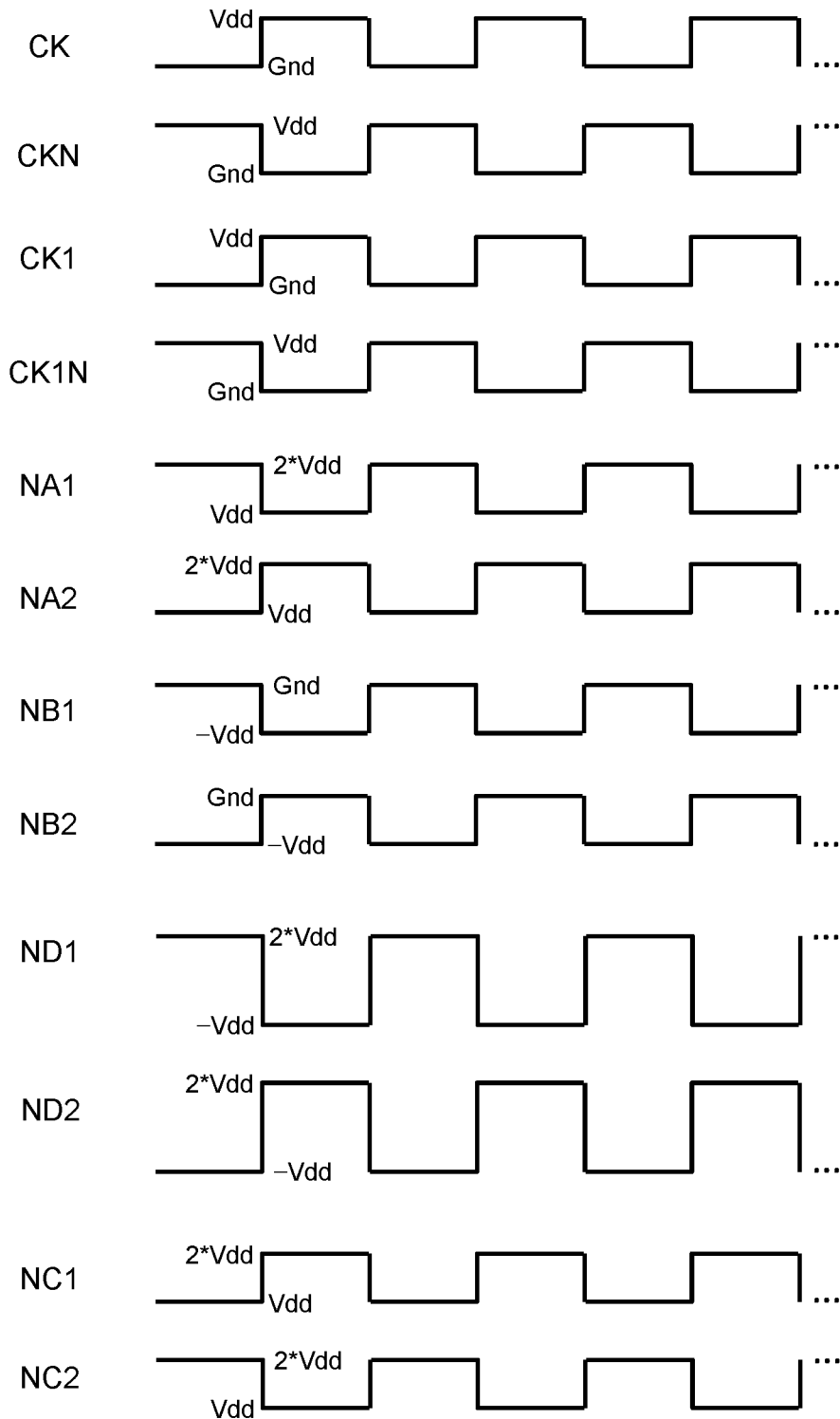
FIG. 6B illustrates operational waveforms for the circuit of FIG. 6A.

FIG. 6B shows the waveforms for the clock signals CK, CKN, CK1 and CK1N as well as the signals at nodes NA1, NA2, NB1, NB2, ND1, ND2, NC1 and NC2 for the operation of the circuit 400p of FIG. 6A. It will be noted that, for ease of understanding the operation of the circuit 400p, signal propagation delays are not shown in the FIG. 6B waveforms. It will be further noted that the voltage levels of the clock signals are idealized, and that as implemented the voltages will be substantially equal to (for example, within 1-20%), but not necessarily equal to, the ideal ±Vdd and 2*Vdd voltage levels.

The bootstrap-based level shifting circuitry formed by the circuits 410p and 412p with the bootstrapping circuits 405p and 405n operates to generate at nodes ND1 and ND2 respective clock signals that switch between the −Vdd voltage level and the +2*Vdd voltage level. In particular, the positive bootstrapping circuit 405p operates to generate the clock signals at nodes NA1 and NA2 (in a manner as described in detail elsewhere herein) that switch between the Vdd voltage level and the 2*Vdd voltage level. The transistors MP5 and MP6 of the circuits 410p and 412p, respectively, are turned on in response to the 2*Vdd voltage level and pass that voltage to nodes ND1 and ND2. The negative bootstrapping circuit 405n operates to generate the clock signals at nodes NB1 and NB2 (in a manner as described in detail elsewhere herein) that switch between the −Vdd voltage level and the ground voltage level. The transistors MN5 and MN6 of the circuits 410p and 412p, respectively, are turned on in response to the −Vdd voltage level and pass that voltage to nodes ND1 and ND2.

The circuitry formed by capacitor C1, C2 and inverters 416p, 418p functions in response to the clock signals CK1, CK1N referenced to the power supply Vdd and ground to generate clock signals at nodes NC1, NC2 referenced to 2*Vdd and Vdd. Consider the following operation with respect to the circuit with capacitor C1 and inverter 416p: when clock signal CK1N is logic high, the output of the inverter 416p is logic low. At the same time, transistor MN1 is turned on by the 2*Vdd voltage level at node ND1 and the capacitor C1 is charged to the Vdd voltage level. In the next phase of the clock signals, clock signal CK1N is logic low, and the output of the inverter 416p is logic high. The voltage at node NC1 is boosted through capacitor C1 to the 2*Vdd voltage level. A similar process occurs with respect to the circuit with capacitor C2 and inverter 318p in response to the phases of the clock signal CK1.

The charge transfer transistors MP1 and MP2 respond to the −Vdd voltage level at nodes ND1 and ND2 when the voltage at nodes NC1 and NC2, respectively, is at the boosted 2*Vdd voltage level to pass that voltage to the output node 404.

An advantage of the circuit implementation is an increase in the Vgs of the charge transfer switching transistors, especially in connection with the operation of transistors MP1 and MP2 when gate driven by −Vdd, in order to reduce the on-resistance (Rds_on).

Figure 6C:
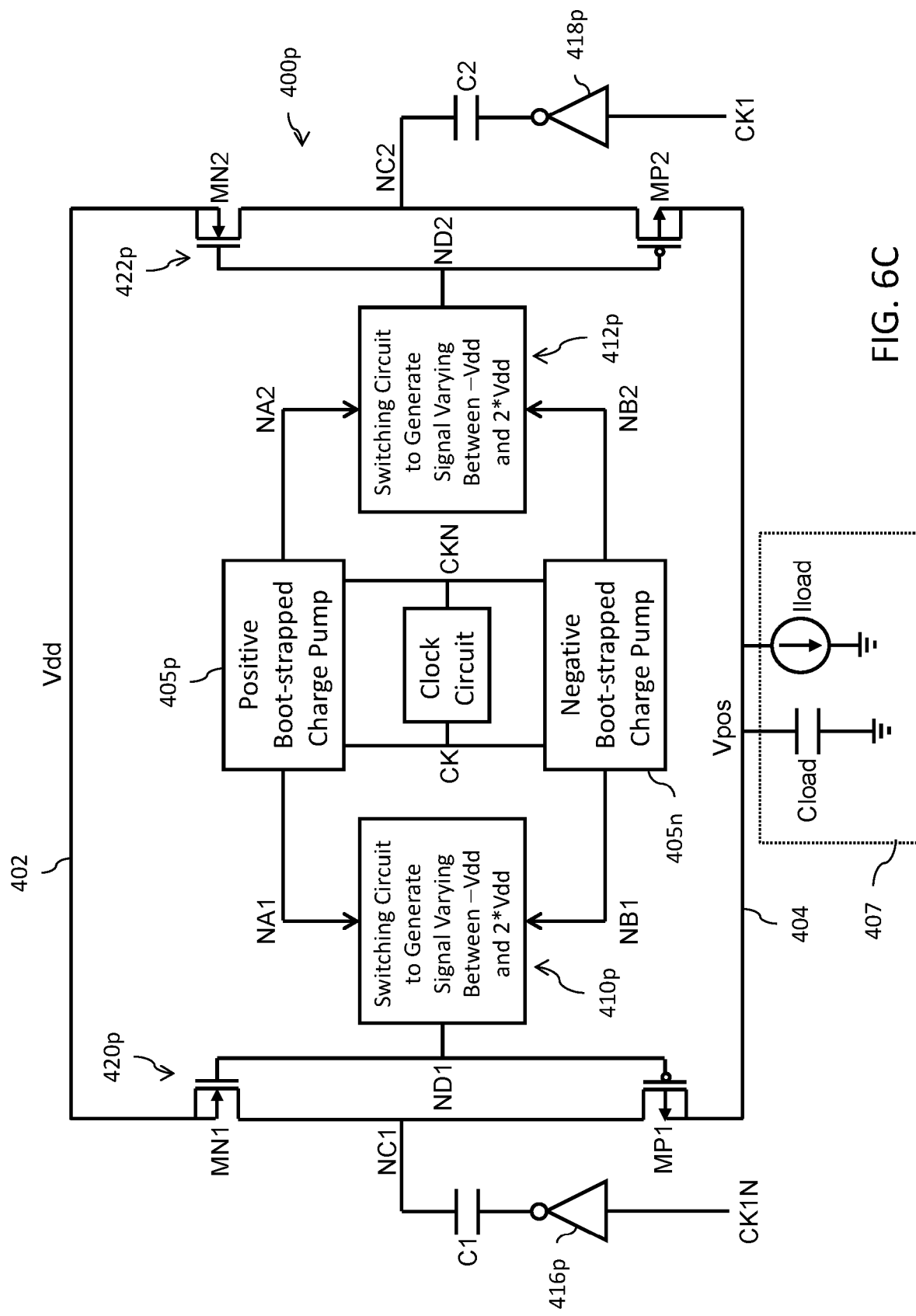
FIG. 6C shows a more generic circuit configuration for the positive charge pump circuit of FIG. 6A.

A more generic circuit configuration for the positive charge pump circuit 400p of FIG. 6A is shown in FIG. 6C. The circuit 400p is configured to increase the gate-to-source voltage (Vgs) of the charge transfer transistors (switches) MP1 and MP2 in order to reduce their "on" resistances. A negative voltage bootstrap circuit 405n generates a negative voltage (−Vdd) at nodes NB1 and NB2 and a positive voltage bootstrap circuit 405p generates a positive voltage (2*Vdd) at nodes NA1 and NA2. These voltages are selectively switched in response to clock signals generated by a clock circuit for application to the common gate terminals of the transistors MN1, MN2, MP1 and MP2. In particular, the −Vdd voltage provides boost for the transistors MP1 and MP2. The gate drive signals for the transistors MP1 and MP2 alternate in response to the clock signals between −Vdd and 2*Vdd under the control of the switching circuits 410p and 412p. A boosted voltage of 2*Vdd is generated at nodes NC1 and NC2 and is passed by the transistors MP1 and MP2 at times when the gate terminal of transistors MP1 and MP2 is biased by the −Vdd voltage. The effective Vgs of the transistors MP1 and MP2 during the charge transfer phase is accordingly 3*Vdd, which results in a substantially reduced switch resistance.

Figure 7A:
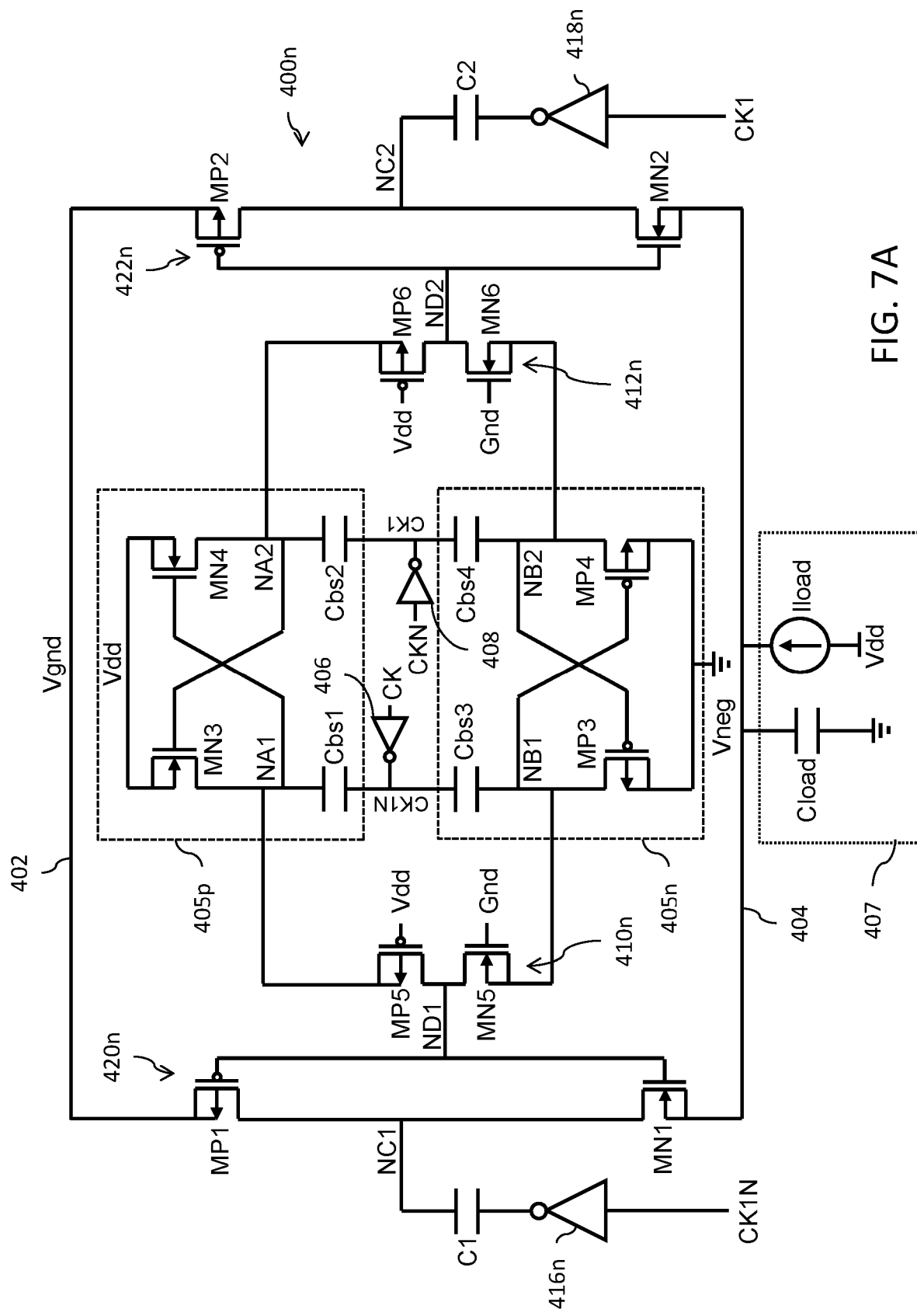
FIG. 7A is a circuit diagram for a negative charge pump circuit.

Reference is made to FIG. 7A showing a circuit diagram for a negative charge pump circuit 400n. The circuit 400n includes a p-channel MOS transistor MP1 having a source terminal coupled to supply node 402 and a drain terminal coupled to intermediate node NC1 and a p-channel MOS transistor MP2 having a source terminal coupled to supply node 402 and a drain terminal coupled to intermediate node NC2. The circuit 400n further includes an n-channel MOS transistor MN1 having a source terminal coupled to output node 404 and a drain terminal coupled to node NC1 and an n-channel MOS transistor MN2 having a source terminal coupled to output node 404 and a drain terminal coupled to intermediate node NC2. The gates of the transistors MN1 and MP1 are coupled to node ND1, and the gates of the transistors MN2 and MP2 are coupled to node ND2. The transistors MN1 and MP1 form a CMOS switching circuit 420n and the transistors MN2 and MP2 form a CMOS switching circuit 422n.

The negative charge pump circuit 400n further includes a positive bootstrapping circuit 405p including an n-channel MOS transistor MN3 having a source terminal coupled to the supply voltage node Vdd and a drain terminal coupled to intermediate node NA1 and an n-channel MOS transistor MN4 having a source terminal coupled to the supply voltage node Vdd and a drain terminal coupled to intermediate node NA2. The transistors MN3 and MN4 are cross-coupled with the gate terminal of transistor MN3 coupled to the drain terminal of transistor MN4 at node NA2 and the gate terminal of transistor MN4 coupled to the drain terminal of transistor MN3 at node NA1.

A bootstrap capacitor Cbs1 has one terminal coupled to node NA1 and another terminal coupled to receive a logical inversion of a clock signal CK, that logical inversion CK1N being generated by a CMOS inverter circuit 406 powered from a positive supply voltage Vdd and receiving clock signal CK as an input. A bootstrap capacitor Cbs2 has one terminal coupled to node NA2 and another terminal coupled to receive a logical inversion of a clock signal CKN (which is a logical inversion of the clock signal CK), that logical inversion CK1 being generated by a CMOS inverter circuit 408 powered from the positive supply voltage Vdd and receiving clock signal CKN as an input.

The negative charge pump circuit 400n further includes a negative bootstrapping circuit 405n including a p-channel MOS transistor MP3 having a source terminal coupled to a ground node and a drain terminal coupled to intermediate node NB1 and a p-channel MOS transistor MP4 having a source terminal coupled to the ground node and a drain terminal coupled to intermediate node NB2. The transistors MP3 and MP4 are cross-coupled with the gate terminal of transistor MP3 coupled to the drain terminal of transistor MP4 at node NB2 and the gate terminal of transistor MP4 coupled to the drain terminal of transistor MP3 at node NB1.

A bootstrap capacitor Cbs3 has one terminal coupled to node NB1 and another terminal coupled to receive the logical inversion of the clock signal CK generated by CMOS inverter circuit 406. A bootstrap capacitor Cbs4 has one terminal coupled to node NB2 and another terminal coupled to receive the logical inversion of the clock signal CKN generated by CMOS inverter circuit 408.

A CMOS switching circuit 410n has a first terminal coupled to receive the positive supply voltage Vdd, a second terminal coupled to receive the ground voltage Gnd and a third terminal at intermediate node ND1. A source terminal of the p-channel MOS transistor MP5 in switching circuit 410p is coupled to node NA1 at the output of the positive bootstrapping circuit 405p and a source terminal of the n-channel MOS transistor MN5 in switching circuit 410p is coupled to intermediate node NB1 at the output of the negative bootstrapping circuit 405n. The third terminal is at the common drains of transistors MP5 and MN5 which is connected to the gate terminals of the transistors MP1 and MN1 in CMOS switching circuit 420n. The gate of transistor MP5 is coupled to the first terminal (Vdd) and the gate of transistor MN5 is coupled to the second terminal (Gnd).

A CMOS switching circuit 412n has a first terminal coupled to receive the positive supply voltage Vdd, a second terminal coupled to receive the ground voltage Gnd, and a third terminal at intermediate node ND2. A source terminal of the p-channel MOS transistor MP6 in switching circuit 412n is coupled to node NA2 at the output of the positive bootstrapping circuit 405p and a source terminal of the n-channel MOS transistor MN6 in switching circuit 412p is coupled to intermediate node NB2 at the output of the negative bootstrapping circuit 405n. The third terminal is at the common drains of transistors MP6 and MN6 which is connected to the gate terminals of the transistors MP2 and MN2 in CMOS switching circuit 422n. The gate of transistor MP6 is coupled to the first terminal (Vdd) and the gate of transistor MN6 is coupled to the second terminal (Gnd).

The circuits 410n and 412n with the bootstrapping circuits 405p and 405n form a bootstrap-based level shifting circuit.

A capacitor C1 has one terminal coupled to node NC1 and another terminal coupled to receive the logical inversion of the clock signal CK1N, that logical inversion being generated by a CMOS inverter circuit 416n powered from the positive supply voltage Vdd and receiving clock signal CK1N as an input. A capacitor C2 has one terminal coupled to node NC2 and another terminal coupled to receive a logical inversion of the clock signal CK1, that logical inversion being generated by a CMOS inverter circuit 418n powered from the positive supply voltage Vdd and receiving clock signal CK1 as an input.

A load 407 of the circuit 400n is schematically represented by a load capacitor Cload having one terminal coupled to output node 404 and a second terminal coupled to the ground node and a current source Iload coupled between output node 404 and the supply node Vdd.

The supply node 402 is configured to receive the ground voltage Vgnd. The output node 404 is configured with this negative charge pump circuit 400n to accordingly generate a multiplied negative output voltage Vneg, where Vneg is approximately −Vdd.

Figure 7B:
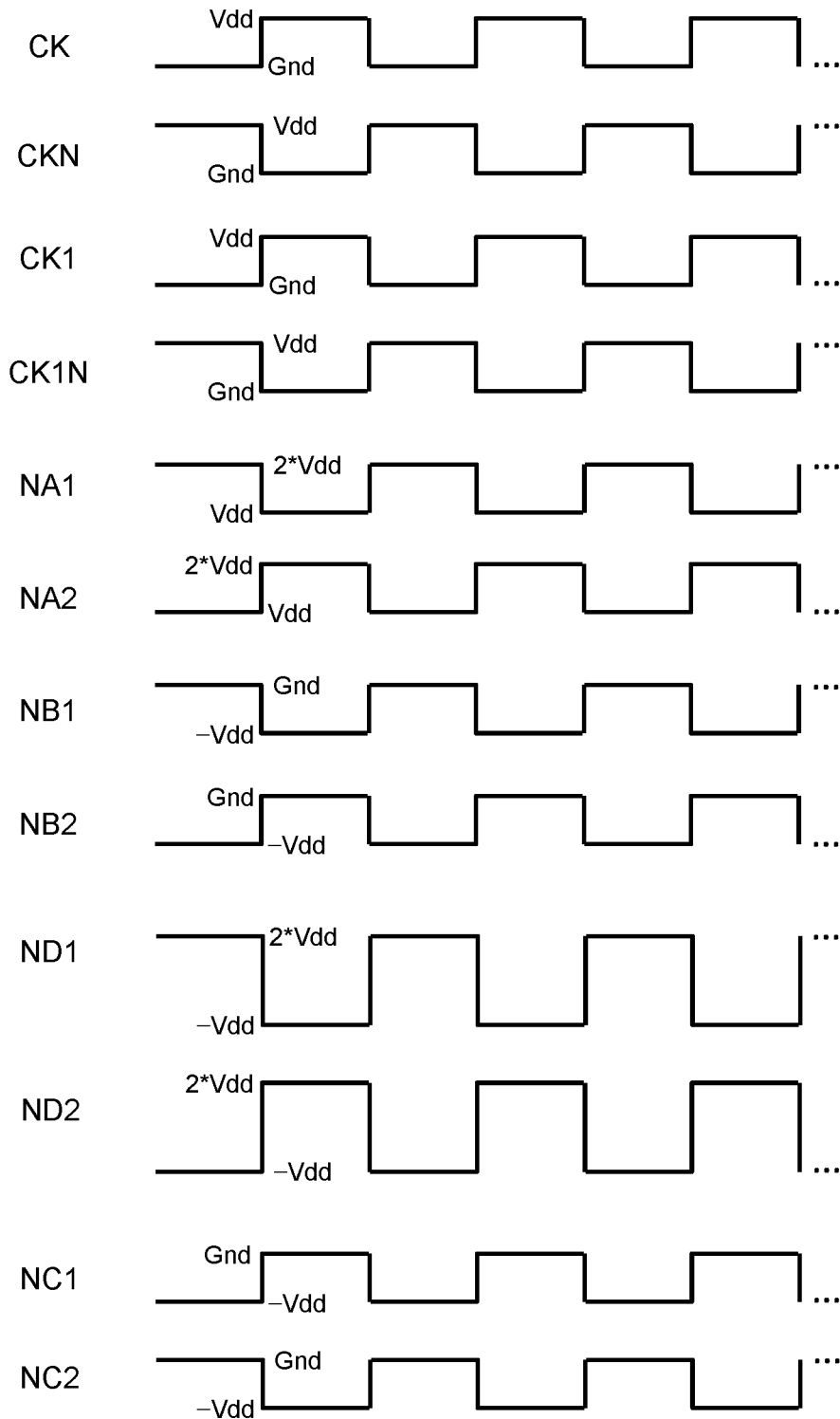
FIG. 7B illustrates operational waveforms for the circuit of FIG. 7A.

FIG. 7B shows the waveforms for the clock signals CK, CKN, CK1 and CK1N as well as the signals at nodes NA1, NA2, NB1, NB2, ND1, ND2, NC1 and NC2 for the operation of the circuit 400n of FIG. 7A. It will be noted that, for ease of understanding the operation of the circuit 400n, signal propagation delays are not shown in the FIG. 7B waveforms. It will be further noted that the voltage levels of the clock signals are idealized, and that as implemented the voltages will be substantially equal to (for example, within 1-20%), but not necessarily equal to, the ideal ±Vdd and 2*Vdd voltage levels.

The bootstrap-based level shifting circuitry formed by the circuits 410n and 412n with the bootstrapping circuits 405p and 405n operates to generate at nodes ND1 and ND2 respective clock signals that switch between the −Vdd voltage level and the +2*Vdd voltage level. In particular, the positive bootstrapping circuit 405p operates to generate the clock signals at nodes NA1 and NA2 (in a manner as described in detail elsewhere herein) that switch between the Vdd voltage level and the 2*Vdd voltage level. The transistors MP5 and MP6 of the circuits 410n and 412n, respectively, are turned on in response to the 2*Vdd voltage level and pass that voltage to nodes ND1 and ND2. The negative bootstrapping circuit 405n operates to generate the clock signals at nodes NB1 and NB2 (in a manner as described in detail elsewhere herein) that switch between the −Vdd voltage level and the ground voltage level. The transistors MN5 and MN6 of the circuits 410n and 412n, respectively, are turned on in response to the −Vdd voltage level and pass that voltage to nodes ND1 and ND2.

The circuitry formed by capacitor C1, C2 and inverters 416n, 418n functions in response to the clock signals CK1, CK1N referenced to the power supply Vdd and ground to generate clock signals at nodes NC1, NC2 referenced to −Vdd and ground. Consider the following operation with respect to the circuit with capacitor C1 and inverter 416n: when clock signal CK1N is logic low, the output of the inverter 416n is logic high. At the same time, transistor MP1 is turned on by the −Vdd voltage level at node ND1 and the capacitor C1 is charged to the ground voltage level. In the next phase of the clock signals, clock signal CK1N is logic high, and the output of the inverter 416n is logic low. The voltage at node NC1 is boosted through capacitor C1 to the −Vdd voltage level. A similar process occurs with respect to the circuit with capacitor C2 and inverter 418n in response to the phases of the clock signal CK1.

The charge transfer transistors MN1 and MN2 respond to the +2*Vdd voltage level at nodes ND1 and ND2 when the voltage at nodes NC1 and NC2, respectively, is at the boosted −Vdd voltage level to pass that voltage to the output node 404.

An advantage of the circuit implementation is an increase in the Vgs of the charge transfer switching transistors, especially in connection with the operation of transistors MN1 and MN2 when gate driven by 2*Vdd, in order to reduce the on-resistance (Rds_on).

Figure 7C:
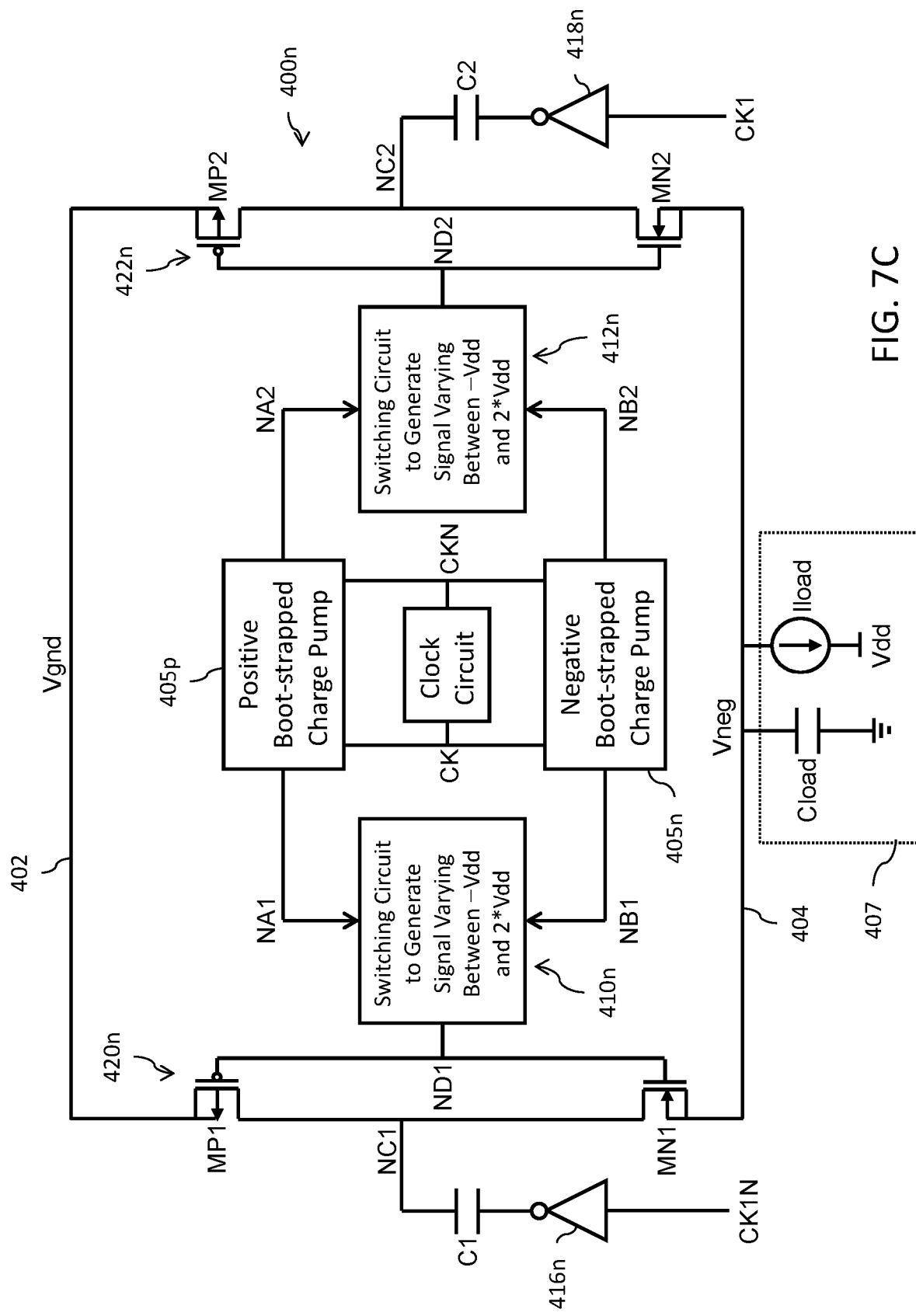
FIG. 7C shows a more generic circuit configuration for the negative charge pump circuit of FIG. 7A.

A more generic circuit configuration for the negative charge pump circuit 400n of FIG. 7A is shown in FIG. 7C. The circuit 400n is configured to increase the gate-to-source voltage (Vgs) of the charge transfer transistors (switches) MN1 and MN2 in order to reduce their "on" resistances. A negative voltage bootstrap circuit 405n generates a negative voltage (−Vdd) at nodes NB1 and NB2 and a positive voltage bootstrap circuit 405p generates a positive voltage (2*Vdd) at nodes NA1 and NA2. These voltages are selectively switched in response to clock signals generated by a clock circuit for application to the common gate terminals of the transistors MN1, MN2, MP1 and MP2. In particular, the 2*Vdd voltage provides boost for the transistors MN1 and MN2. The gate drive signals for the transistors MN1 and MN2 alternate in response to the clock signals between −Vdd and 2*Vdd under control of the switching circuits 410n and 412n. A boosted voltage of −Vdd generated at nodes NC1 and NC2 is passed by the transistors MN1 and MN2 at times when the gate terminal of transistors MN1 and MN2 is biased by the 2*Vdd voltage. The effective Vgs of the transistors MN1 and MN2 during the charge transfer phase is accordingly 3*Vdd, which results in a substantially reduced switch resistance.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A positive charge pump circuit configured to generate an output voltage from an input voltage, wherein a positive voltage level of the output voltage is more positive than a voltage level of the input voltage, comprising:
   a negative bootstrapping circuit configured to generate a control signal in response to a first clock signal, wherein the control signal switches between a ground voltage and a negative voltage;
   a voltage boosting circuit configured to generate a positively boosted voltage in response to a second clock signal; and
   a charge transfer transistor having a drain terminal coupled to receive said positively boosted voltage and a source terminal coupled to an output node, wherein a gate terminal of the charge transfer transistor is biased by the negative voltage of the control signal to turn on and pass the positively boosted voltage to the output node and generate said output voltage.

2. The positive charge pump circuit of claim 1, wherein the first clock signal is a logic inverse of the second clock signal.

3. The positive charge pump circuit of claim 1, further comprising a level shifting circuit configured to receive said control signal and generate a level shifted control signal that switches between a level of the positively boosted voltage and said negative voltage, and wherein the level shifted control signal is applied to the gate terminal of the charge transfer transistor.

4. The positive charge pump circuit of claim 3, wherein the level shifting circuit comprises a first MOS transistor of a first conductivity type having a source coupled to receive said control signal and a second MOS transistor of a second conductivity type having a source coupled to receive a signal at the level of said positively boosted voltage, wherein a common drain of the first and second MOS transistors is configured to generate said level shifted control signal.

5. The positive charge pump circuit of claim 4, wherein the first MOS transistor is gate biased by a first voltage and where the second MOS transistor is gate biased by a second voltage, wherein a level of the second voltage is more positive than a level of the first voltage.

6. The positive charge pump circuit of claim 1, wherein the voltage boosting circuit comprises:
   a transistor having a source terminal coupled to the input voltage and having a drain terminal where the positively boosted voltage is generated;
   a capacitor having a first terminal coupled to the drain terminals of said transistor and the charge transfer transistor; and
   an inverter circuit having an input coupled to receive the second clock signal and an output coupled to a second terminal of the capacitor.

7. The positive charge pump circuit of claim 1, wherein the negative bootstrapping circuit comprises:
   a transistor having a source terminal coupled to the ground voltage and having a drain terminal where the control signal is generated;
   a capacitor having a first terminal coupled to the drain terminal of said transistor; and
   an inverter circuit having an input coupled to receive the first clock signal and an output coupled to a second terminal of the capacitor.

8. A negative charge pump circuit configured to generate an output voltage from an input voltage, wherein a negative voltage level of the output voltage is more negative than a voltage level of the input voltage, comprising:
   a positive bootstrapping circuit configured to generate a control signal in response to a first clock signal, wherein the control signal switches between a first positive voltage and a second positive voltage, wherein a voltage level of the second positive voltage is more positive than a voltage level of the first positive voltage;
   a voltage boosting circuit configured to generate a negatively boosted voltage in response to a second clock signal; and
   a charge transfer transistor having a drain terminal coupled to receive said negatively boosted voltage and a source terminal coupled to an output node, wherein a gate terminal of the charge transfer transistor is biased by the second positive voltage of the control signal to turn on and pass the negatively boosted voltage to the output node and generate said output voltage.

9. The negative charge pump circuit of claim 8, wherein the first clock signal is a logic inverse of the second clock signal.

10. The negative charge pump circuit of claim 8, further comprising a level shifting circuit configured to receive said control signal and generate a level shifted control signal that switches between a level of the negatively boosted voltage and said second positive voltage, and wherein the level shifted control signal is applied to the gate terminal of the charge transfer transistor.

11. The negative charge pump circuit of claim 10, wherein the level shifting circuit comprises a first MOS transistor of a first conductivity type having a source coupled to receive said control signal and a second MOS transistor of a second conductivity type having a source coupled to receive a signal at the level of said negatively boosted voltage, wherein a common drain of the first and second MOS transistors is configured to generate said level shifted control signal.

12. The negative charge pump circuit of claim 11, wherein the first MOS transistor is gate biased by a first voltage and where the second MOS transistor is gate biased by a second voltage, wherein a level of the first voltage is more positive than a level of the second voltage.

13. The negative charge pump circuit of claim 8, wherein the voltage boosting circuit comprises:
   a transistor having a source terminal coupled to the input voltage and having a drain terminal where the negatively boosted voltage is generated;
   a capacitor having a first terminal coupled to the drain terminals of said transistor and the charge transfer transistor; and
   an inverter circuit having an input coupled to receive the second clock signal and an output coupled to a second terminal of the capacitor.

14. The negative charge pump circuit of claim 1, wherein the positive bootstrapping circuit comprises:
   a transistor having a source terminal coupled to a positive supply voltage and having a drain terminal where the control signal is generated;
   a capacitor having a first terminal coupled to the drain terminal of said transistor; and
   an inverter circuit having an input coupled to receive the first clock signal and an output coupled to a second terminal of the capacitor.

15. A positive charge pump circuit configured to generate an output voltage from an input voltage, wherein a positive voltage level of the output voltage is more positive than a voltage level of the input voltage, comprising:
   a negative bootstrapping circuit configured to generate a first control signal in response to a first clock signal, wherein the first control signal switches between a ground voltage and a negative voltage;
   a positive bootstrapping circuit configured to generate a second control signal in response to said first clock signal, wherein the second control signal switches between a first positive voltage and a second positive voltage, wherein a voltage level of the second positive voltage is more positive than a voltage level of the first positive voltage;
   a voltage boosting circuit configured to generate a positively boosted voltage in response to a second clock signal at an intermediate node;
   a first charge transfer transistor having a drain terminal coupled to said intermediate node and a source terminal coupled to receive the input voltage, wherein a gate terminal of the first charge transfer transistor is biased to turn on by the second positive voltage of the second control signal to turn on the first charge transfer transistor and pass the input voltage to the intermediate node; and
   a second charge transfer transistor having a drain terminal coupled to said intermediate node and a source terminal coupled to an output node, wherein a gate terminal of the second charge transfer transistor is biased by the negative voltage of the first control signal to turn on the second charge transfer transistor and pass the positively boosted voltage to the output node and generate said output voltage.

16. The positive charge pump circuit of claim 15, wherein the first clock signal is a logic inverse of the second clock signal.

17. The positive charge pump circuit of claim 15, wherein that gate terminals of the first and second charge transfer transistors are connected to each other to receive a third control signal, wherein the third control signal switches between the negative voltage of the first control signal and the second positive voltage of the second control signal.

18. The positive charge pump circuit of claim 17, further comprising a level shifting circuit configured to receive said first and second control signals and generate said third control signal.

19. The positive charge pump circuit of claim 18, wherein the level shifting circuit comprises a first MOS transistor of a first conductivity type having a source coupled to receive said first control signal and a second MOS transistor of a second conductivity type having a source coupled to receive said second control signal, wherein a common drain of the first and second MOS transistors is configured to generate said third control signal.

20. The positive charge pump circuit of claim 19, wherein the first MOS transistor is gate biased by a first voltage and where the second MOS transistor is gate biased by a second voltage, wherein a level of the second voltage is more positive than a level of the first voltage.

21. The positive charge pump circuit of claim 15, wherein the voltage boosting circuit comprises:
   a capacitor having a first terminal coupled to the drain terminals of said first and second charge transfer transistors; and
   an inverter circuit having an input coupled to receive the second clock signal and an output coupled to a second terminal of the capacitor.

22. The positive charge pump circuit of claim 15, wherein the negative bootstrapping circuit comprises:
   a transistor having a source terminal coupled to the ground voltage and having a drain terminal where the first control signal is generated;
   a capacitor having a first terminal coupled to the drain terminal of said transistor; and
   an inverter circuit having an input coupled to receive the first clock signal and an output coupled to a second terminal of the capacitor.

23. The positive charge pump circuit of claim 15, wherein the positive bootstrapping circuit comprises:
   a transistor having a source terminal coupled to the input voltage and having a drain terminal where the second control signal is generated;
   a capacitor having a first terminal coupled to the drain terminal of said transistor; and
   an inverter circuit having an input coupled to receive the first clock signal and an output coupled to a second terminal of the capacitor.

24. A negative charge pump circuit configured to generate an output voltage from an input voltage, wherein a negative voltage level of the output voltage is more negative than a voltage level of the input voltage, comprising:
   a negative bootstrapping circuit configured to generate a first control signal in response to a first clock signal, wherein the first control signal switches between a ground voltage and a negative voltage;
   a positive bootstrapping circuit configured to generate a second control signal in response to said first clock signal, wherein the second control signal switches between a first positive voltage and a second positive voltage, wherein a voltage level of the second positive voltage is more positive than a voltage level of the first positive voltage;
   a voltage boosting circuit configured to generate a negatively boosted voltage in response to a second clock signal at an intermediate node;
   a first charge transfer transistor having a drain terminal coupled to said intermediate node and a source terminal coupled to receive the input voltage, wherein a gate terminal of the first charge transfer transistor is biased by the negative voltage of the first control signal to turn on the first charge transfer transistor and pass the input voltage to the intermediate node; and
   a second charge transfer transistor having a drain terminal coupled to said intermediate node and a source terminal coupled to an output node, wherein a gate terminal of the second charge transfer transistor is biased by the second positive voltage of the second control signal to turn on the second charge transfer transistor and pass the negatively boosted voltage to the output node and generate said output voltage.

25. The negative charge pump circuit of claim 24, wherein the first clock signal is a logic inverse of the second clock signal.

26. The negative charge pump circuit of claim 24, wherein that gate terminals of the first and second charge transfer transistors are connected to each other to receive a third control signal, wherein the third control signal switches between the negative voltage of the first control signal and the second positive voltage of the second control signal.

27. The negative charge pump circuit of claim 26, further comprising a level shifting circuit configured to receive said first and second control signals and generate said third control signal.

28. The negative charge pump circuit of claim 27, wherein the level shifting circuit comprises a first MOS transistor of a first conductivity type having a source coupled to receive said first control signal and a second MOS transistor of a second conductivity type having a source coupled to receive said second control signal, wherein a common drain of the first and second MOS transistors is configured to generate said third control signal.

29. The negative charge pump circuit of claim 28, wherein the first MOS transistor is gate biased by a first voltage and where the second MOS transistor is gate biased by a second voltage, wherein a level of the second voltage is more positive than a level of the first voltage.

30. The negative charge pump circuit of claim 24, wherein the voltage boosting circuit comprises:
   a capacitor having a first terminal coupled to the drain terminals of said first and second charge transfer transistors; and
   an inverter circuit having an input coupled to receive the second clock signal and an output coupled to a second terminal of the capacitor.

31. The negative charge pump circuit of claim 24, wherein the negative bootstrapping circuit comprises:
   a transistor having a source terminal coupled to the ground voltage and having a drain terminal where the first control signal is generated;
   a capacitor having a first terminal coupled to the drain terminal of said transistor; and
   an inverter circuit having an input coupled to receive the first clock signal and an output coupled to a second terminal of the capacitor.

32. The negative charge pump circuit of claim 24, wherein the positive bootstrapping circuit comprises:
   a transistor having a source terminal coupled to the input voltage and having a drain terminal where the second control signal is generated;

a capacitor having a first terminal coupled to the drain terminal of said transistor; and an inverter circuit having an input coupled to receive the first clock signal and an output coupled to a second terminal of the capacitor.

33. A positive charge pump circuit configured to generate an output voltage from an input voltage, wherein a positive voltage level of the output voltage is more positive than a voltage level of the input voltage, comprising:

a negative bootstrapping circuit configured to generate a negative voltage in response to a first clock signal;

a voltage boosting circuit configured to generate a positively boosted voltage in response to a second clock signal;

a switching circuit coupled to receive the negative voltage from the negative bootstrapping circuit and receive the positively boosted voltage from the voltage boosting circuit and configured to switch a control signal between the negative voltage and the positively boosted voltage; and a charge transfer transistor having a drain terminal coupled to receive said positively boosted voltage and a source terminal coupled to an output node, wherein the control signal is applied to a gate terminal of the charge transfer transistor where the negative voltage of the control signal controls turn on of the charge transfer transistor to pass the positively boosted voltage to the output node and generate said output voltage.

34. A negative charge pump circuit configured to generate an output voltage from an input voltage, wherein a negative voltage level of the output voltage is more negative than a voltage level of the input voltage, comprising:

a positive bootstrapping circuit configured to generate a positive voltage in response to a first clock signal;

a voltage boosting circuit configured to generate a negatively boosted voltage in response to a second clock signal;

a switching circuit coupled to receive the positive voltage from the positive bootstrapping circuit and receive the negatively boosted voltage from the voltage boosting circuit and configured to switch a control signal between the positive voltage and the negatively boosted voltage; and a charge transfer transistor having a drain terminal coupled to receive said negatively boosted voltage and a source terminal coupled to an output node, wherein the control signal is applied to a gate terminal of the charge transfer transistor where the positive voltage of the control signal controls turn on of the charge transfer transistor to pass the negatively boosted voltage to the output node and generate said output voltage.

35. A positive charge pump circuit configured to generate an output voltage from an input voltage, wherein a positive voltage level of the output voltage is more positive than a voltage level of the input voltage, comprising:

a negative bootstrapping circuit configured to generate a negative voltage in response to a first clock signal;

a positive bootstrapping circuit configured to generate a positive voltage in response to the first clock signal;

a voltage boosting circuit configured to generate a positively boosted voltage in response to a second clock signal;

a switching circuit coupled to receive the negative voltage from the negative bootstrapping circuit and receive the positive voltage from the positive bootstrapping circuit and configured to switch a control signal between the negative voltage and the positive voltage; and a charge transfer transistor having a drain terminal coupled to receive said positively boosted voltage and a source terminal coupled to an output node, wherein the control signal is applied to a gate terminal of the charge transfer transistor where the negative voltage of the control signal controls turn on of the charge transfer transistor to pass the positively boosted voltage to the output node and generate said output voltage.

36. A negative charge pump circuit configured to generate an output voltage from an input voltage, wherein a negative voltage level of the output voltage is more negative than a voltage level of the input voltage, comprising:

a positive bootstrapping circuit configured to generate a positive voltage in response to a first clock signal;

a negative bootstrapping circuit configured to generate a negative voltage in response to the first clock signal;

a voltage boosting circuit configured to generate a negatively boosted voltage in response to a second clock signal;

a switching circuit coupled to receive the positive voltage from the positive bootstrapping circuit and receive the negative voltage from the negative bootstrapping circuit and configured to switch a control signal between the positive voltage and the negative voltage; and a charge transfer transistor having a drain terminal coupled to receive said negatively boosted voltage and a source terminal coupled to an output node, wherein the control signal is applied to a gate terminal of the charge transfer transistor where the positive voltage of the control signal controls turn on of the charge transfer transistor to pass the negatively boosted voltage to the output node and generate said output voltage.

* * * * *